June 11, 1968    C. K. GIERINGER ET AL    3,388,403
EMPLOYEE IDENTIFICATION CARD RECORDER
Filed Nov. 10, 1966            9 Sheets-Sheet 1
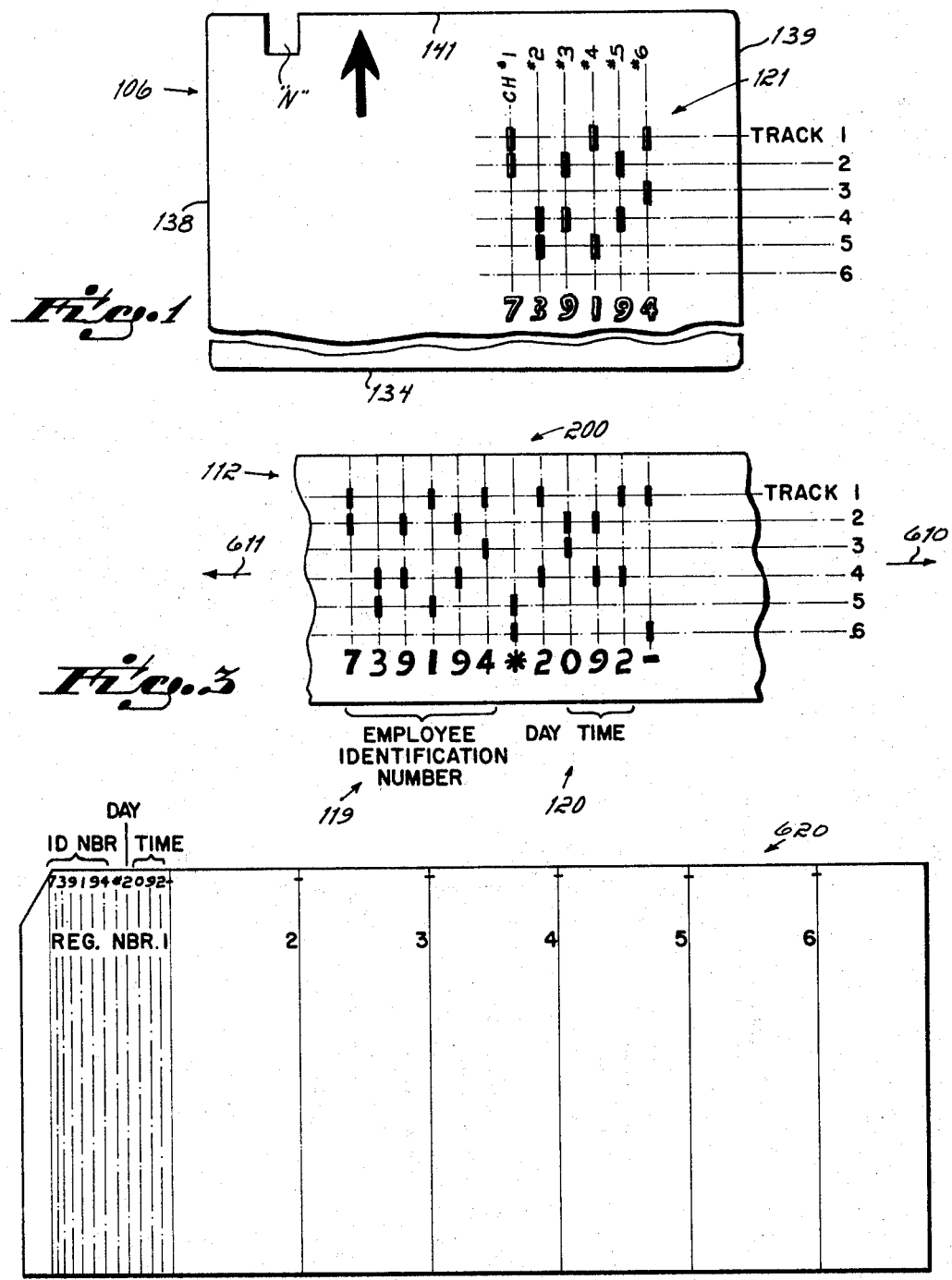

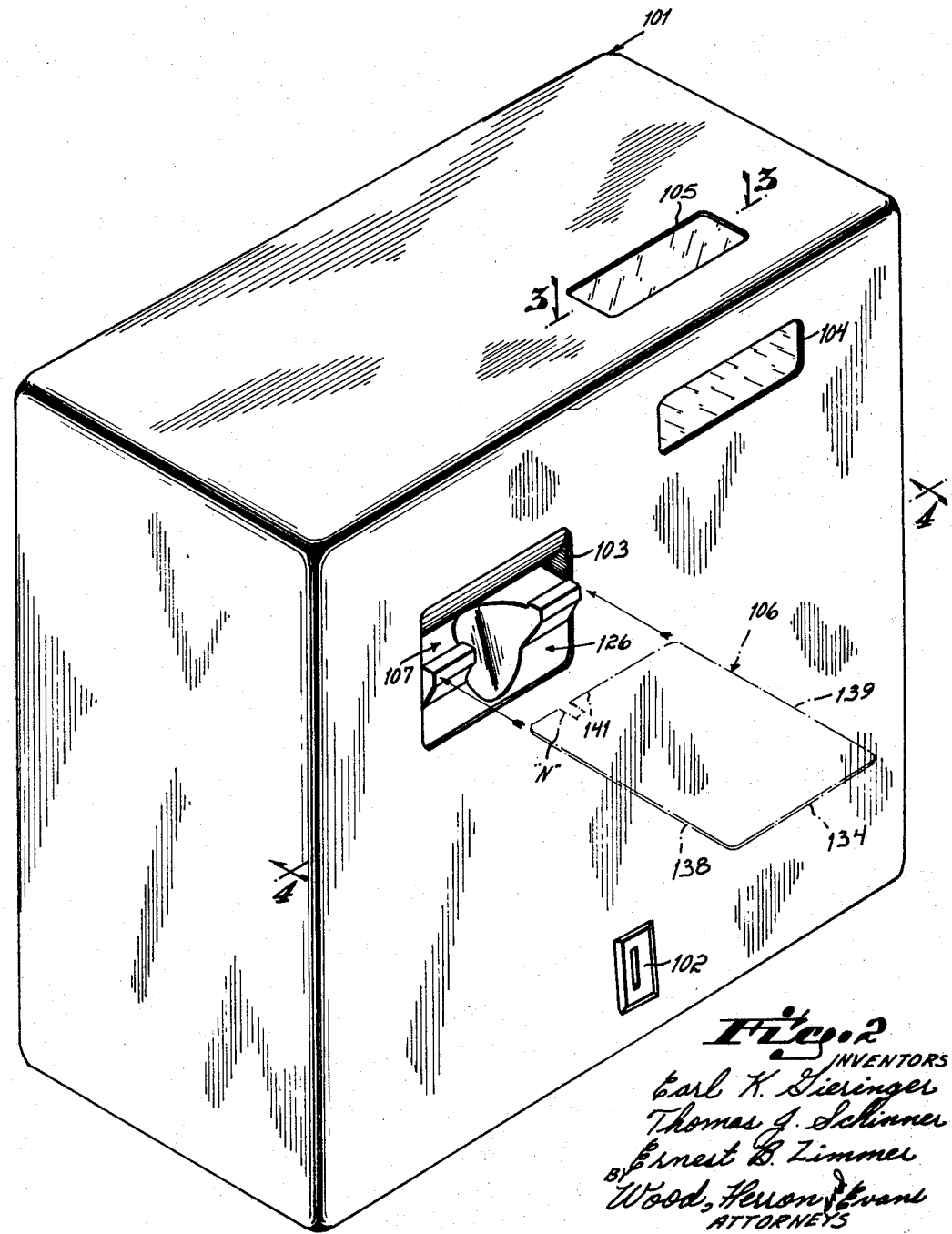

June 11, 1968 C. K. GIERINGER ET AL 3,388,403
EMPLOYEE IDENTIFICATION CARD RECORDER
Filed Nov. 10, 1966 9 Sheets-Sheet 3
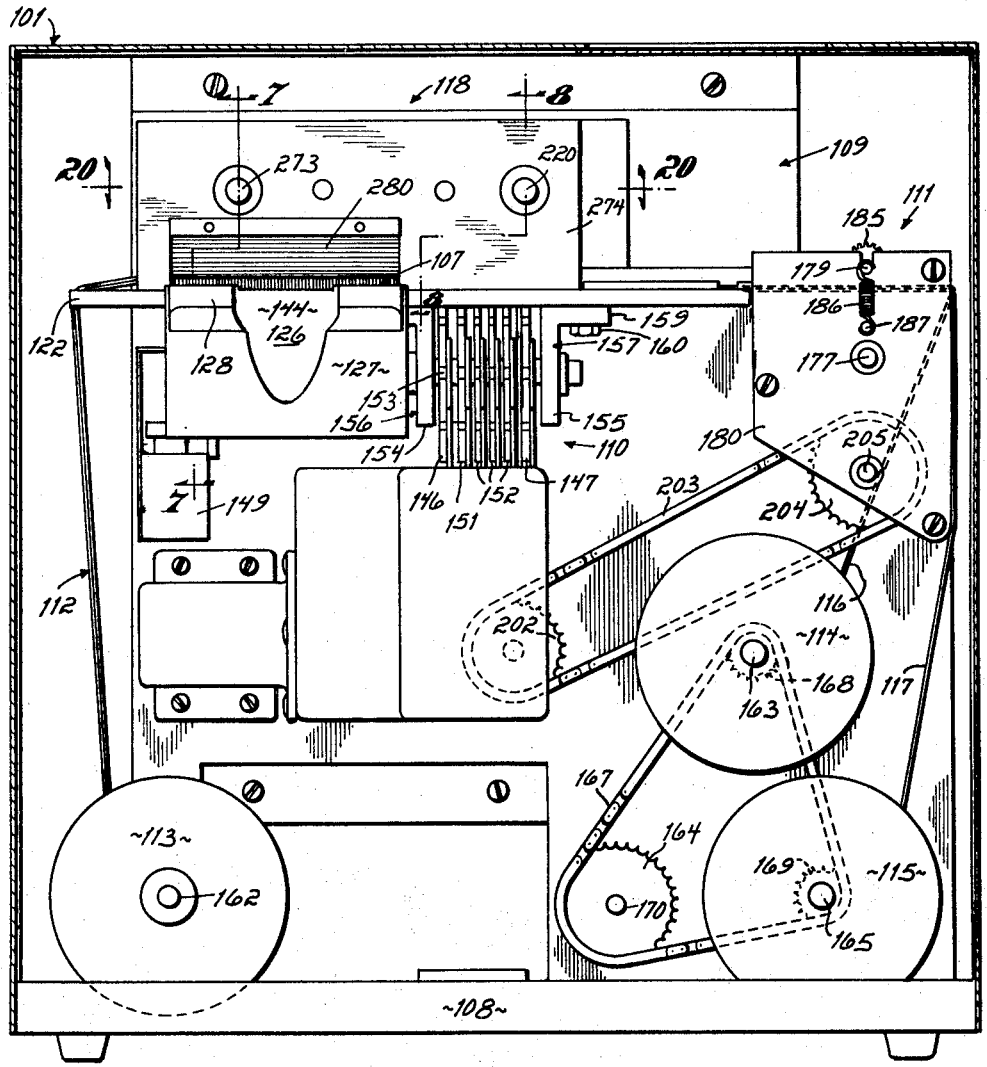
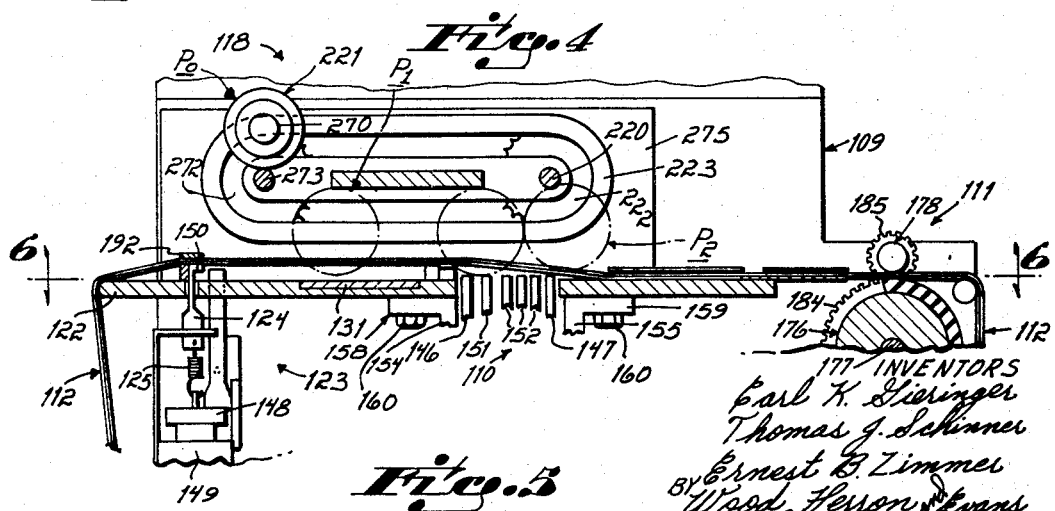
INVENTORS
Carl K. Gieringer
Thomas J. Skinner
Ernest B. Zimmer
BY Wood, Herron & Evans
ATTORNEYS

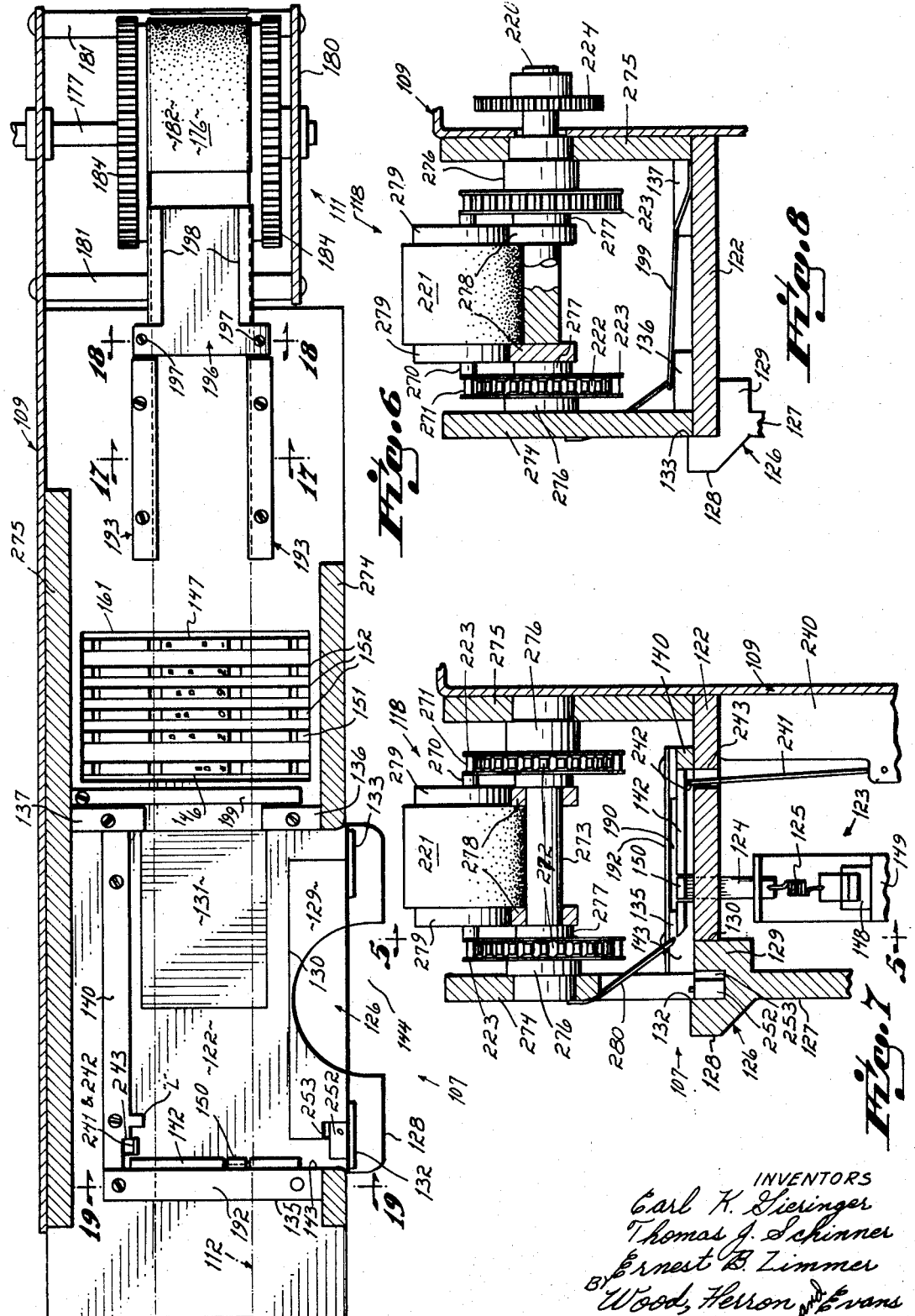

June 11, 1968 C. K. GIERINGER ET AL 3,388,403
EMPLOYEE IDENTIFICATION CARD RECORDER
Filed Nov. 10, 1966 9 Sheets-Sheet 5

INVENTORS
Carl K. Gieringer
Thomas J. Schinner
Ernest B. Zimmer
BY Wood, Herron & Evans
ATTORNEYS

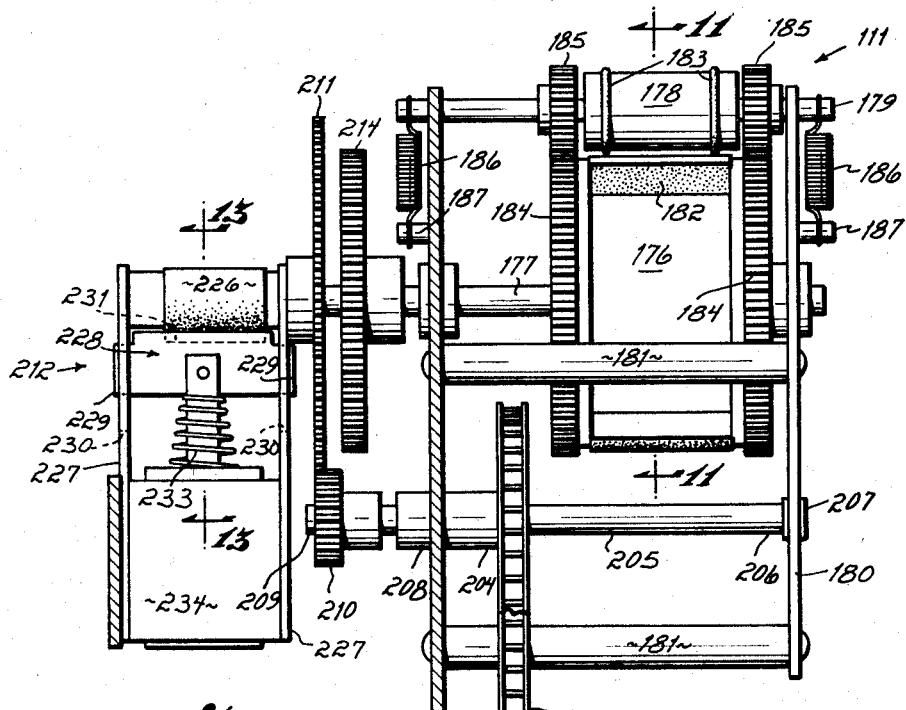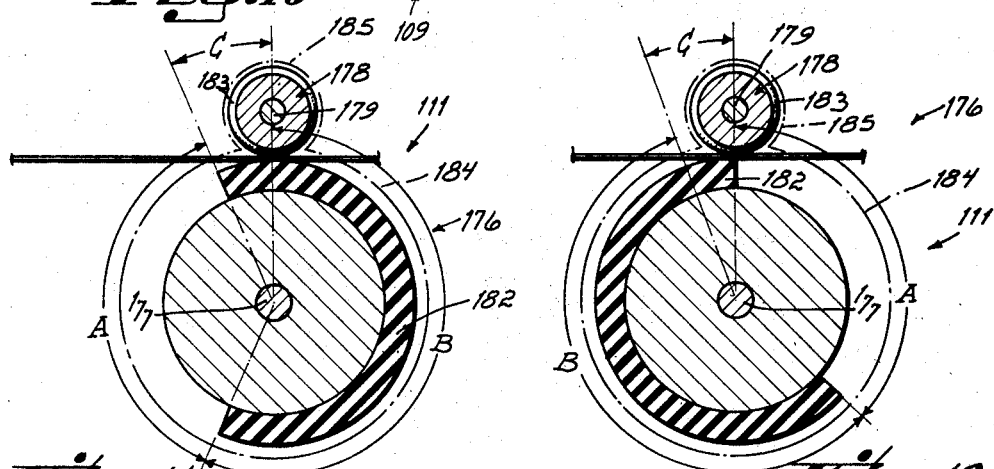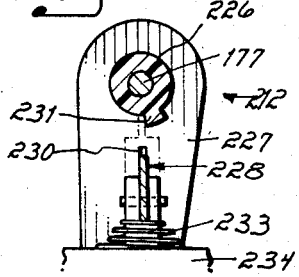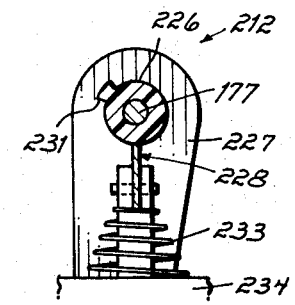

June 11, 1968  C. K. GIERINGER ET AL  3,388,403
EMPLOYEE IDENTIFICATION CARD RECORDER
Filed Nov. 10, 1966  9 Sheets-Sheet 7

INVENTORS
Carl K. Gieringer
Thomas J. Schönner
Ernest B. Zimmer
BY Wood, Herron & Evans
ATTORNEYS

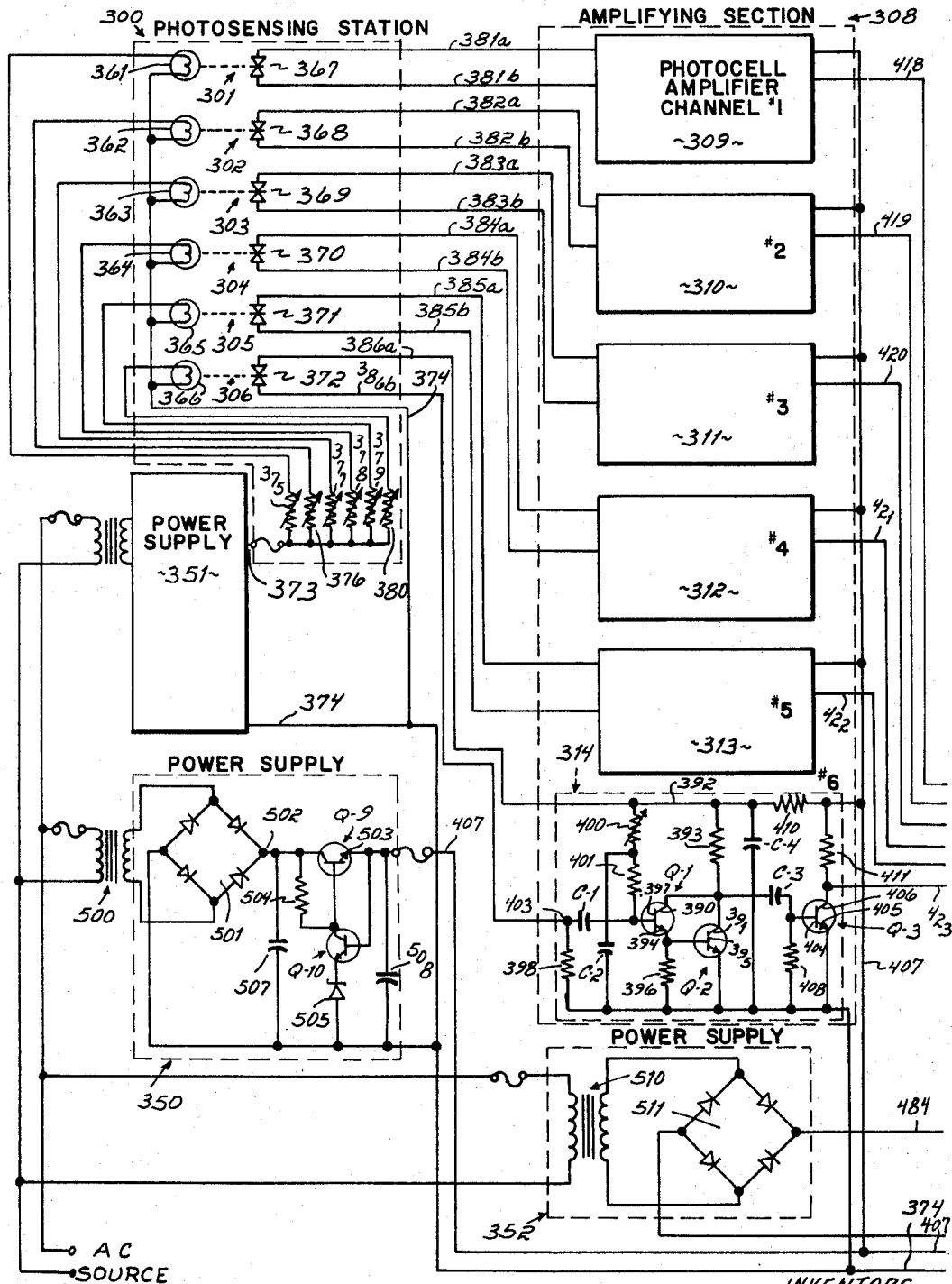

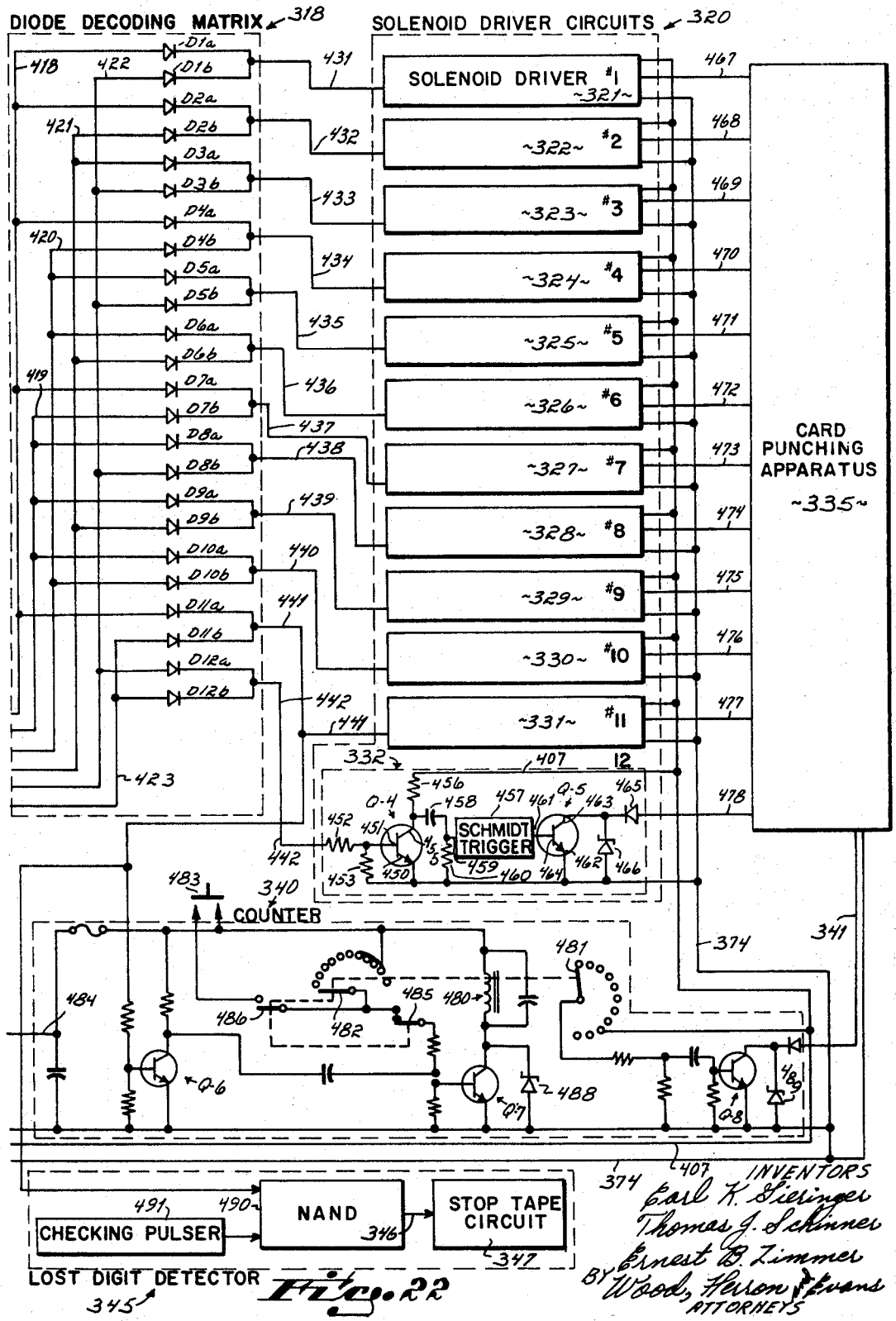

United States Patent Office 3,388,403
Patented June 11, 1968

3,388,403
EMPLOYEE IDENTIFICATION CARD
RECORDER
Carl K. Gieringer, Thomas J. Schinner, and Ernest B.
Zimmer, Cincinnati, Ohio, assignors to The Cincinnati Time Recorder Company, Cincinnati, Ohio, a corporation of Ohio
Filed Nov. 10, 1966, Ser. No. 593,398
6 Claims. (Cl. 346—17)

ABSTRACT OF THE DISCLOSURE

An employee monitoring system is disclosed for providing, on a recording medium, permanent machine readable timed entries of the arrival and departure activities of a plurality of employees. The system includes a plurality of employee identification cards, each having embossed employee-identifying machine readable information thereon, and a recording unit responsive to insertion of a card therein for making a permanent record of the employee-identifying information and the time of card insertion. The recording unit includes a housing having entry viewing means and a card insertion slot, a time head which provides a periodically varying embossment of the current time in machine readable and humanly intelligible form, a card holder positioned adjacent the time head for receiving cards inserted into the slot, a platen for urging the record medium and embossments into imprinting relationship to produce an entry on the record medium of the employee-identifying information and the time of card insertion, and feed means for advancing the entry-bearing portion of the record medium to the viewing station to enable an employee inserting his card into the recording unit to view the entry made and thereby verify the time of card insertion.

---

Figure 9:
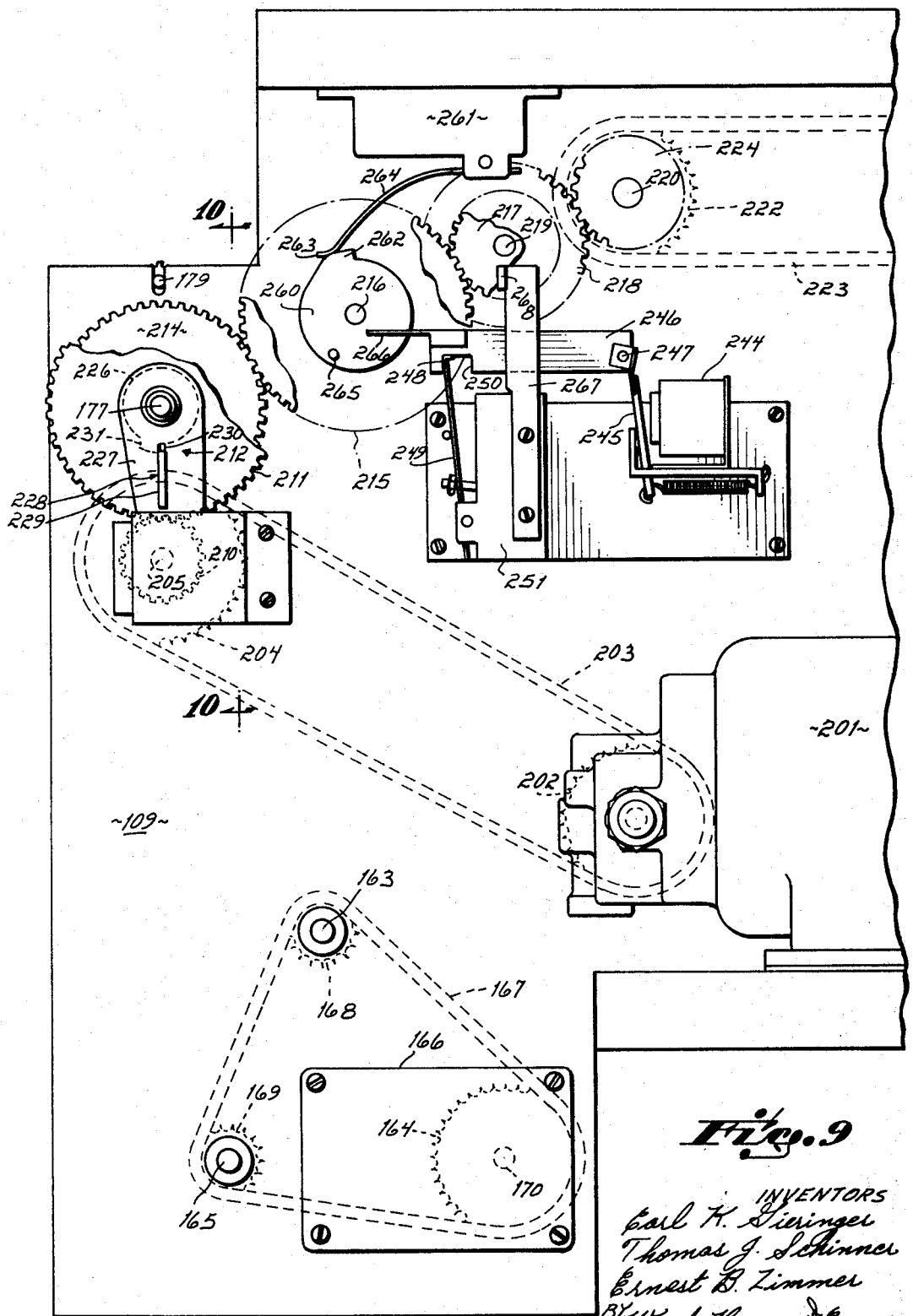

This invention relates to a system for monitoring the attendance of employees at their jobs, and more particularly to a system for recording the times of arrival and departure of employees from their places of employment.

The desirability of providing means for recording the time that employees arrive for work, as well as the time that they leave, has been known for many years. Through this practice, the employer obtains an accurate record of the number of hours worked by each employee during any given period. Such records enable the employer to calculate payroll, compensate at the proper overtime rate for hours worked in excess of the standard work day, etc. In addition, the employer is in a position to determine whether an employee has arrived late for work, or left before the prescribed quitting time.

Two principal approaches have been suggested in the past in an effort to provide employers with a record of the employment activities of their employees. The first approach, and one that has been utilized for many years, involves the use of what has been termed the "time clock" or "punch clock." The punch clock is a device about the size of an office typewriter which is customarily mounted on the wall near the employee's entrance to an office or factory. Mounted alongside the punch clock are one or more racks which contain the employee's individual time cards upon which it is possible for employees to record, by properly inserting their card into a slot in the punch clock, their respective arrival and departure times.

The punch clock device itself generally includes a self-contained time-keeping mechanism which operates a clock and a time and date print head. The clock is mounted within the device, and provides a continuous indication of the correct time through a window formed in the device housing. The indication may be the conventional clock face having an hour and minute hand or it may be a digital display. The time and date print head, which is the other unit driven by the time-keeping mechanism, generally includes a plurality of print wheels. The print wheels are advanced in a manner such that characters representing the current time and date are always present at a print station which is adjacent the slot into which the time cards are inserted.

In operation, the employee, upon entering and leaving the plant, removes his time card from the rack and inserts it into the slot in the punch clock. The punch clock, in response, imprints the time and date on the employee's card. At the end of the week, the cards are collected and the work data processed, and new cards are placed in the rack for use during the following work period.

The second basic approach suggested for providing records of employee work activity involves a system in which each employee is furnished with a key, which has the employee's name or identification number coded thereon. When an employee enters or leaves the plant, he inserts the coded key into a key station located at the plant entrance. The key station is connected to a recorder located in some central place, such as in the payroll department, and in response to the insertion of a key therein is effective to transmit signals to the recorder for producing a record of the employee's name or identification number as well as the time of key insertion. The centrally located recorder includes a suitable clock for providing the time portion of the record entry. Thus, by inserting a coded key into a remote key station, the employee's identity and time of key insertion are recorded at a central station.

While the prior art proposals do provide a record of an employee's arrival and departure activities, a number of problems are encountered in the actual use of these arrangements, many of which are directed to methods of defeating the system. For example, in the case of the punch clock, it has been found that employees in some instances steal their time cards from the rack in an effort to deprive their employer of the benefit of the activity record and thereby conceal the fact that they have, on one or more occasions, been absent, left early, or arrived late. With such time record gone, the employee's activities cannot be seriously contested. Should the employer attempt to question the employee, the employee is usually successful in arguing that it was not he who took the time card, an argument which the employer cannot easily refute since the time cards remain unattended in a rack accessible to all who care to take them.

It has been an object of this invention, therefore, to provide a recording system in which the time records cannot be removed from the recording unit by the unauthorized activity of an employee. In accordance with the principles of this invention, this objective is achieved by employing a fundamentally different approach to recording employee activity in which the employee is issued a card which bears an embossment of his identification number and his name. The employee either carries the identification card upon his person or stores it in a rack near the plant entrance when not in use, and when he enters and leaves the plant he inserts the card into a recording unit which functions to make a facsimile of the embossed information on a suitable recording medium, such as paper tape. The recording unit is equipped with a time and date print head which, when the card is inserted, operates to produce an imprint of the time and date on the tape in a position adjacent the card information facsimile. A housing for enclosing the recording unit is provided to prevent unauthorized access to the recording tape by anyone attempting to alter, remove or otherwise compromise the recorded entries or to tamper with the recording unit mechanism, such as by resetting or advancing the clock.

An advantage of this invention, in addition to the principal feature of preventing theft of the records, is that by providing a window in the housing, it is possible to permit the employee to see the time and date entry made on the record tape in response to the insertion of his card. By allowing the employee to see the entry, disputes as to the accuracy of his recorded work activity, which might otherwise occur if the record is concealed, are not likely to result. Since the employee has the opportunity to see the tape entry as it is made, he has little basis for arguing, at a latter date, that it was in error. Of course, if the recording unit is in fact in error, the employee can immediately notify his employer who is then able to verify the existence of the malfunction in the recording unit and take appropriate action.

Another advantage of this invention is that erroneous records are eliminated, providing the employees are required to carry the identification cards on their person. It is not uncommon, when time cards are misplaced in the time card rack, for an employee to take another's time card from the place in the rack where he customarily stores his own time card and, without checking the ownership of the time card, insert it into the punch clock thereby producing an erroneous entry on the card. Such careless mistakes, in addition to providing an erroneous entry on the time card of another, also prevent the recording on the employee's time card of his arrival or departure time. Thus, an incomplete record of the careless employee's activities results.

A further advantage of this invention, assuming the employees are required to carry the card on their person, is that the practice of purposely "punching out" for another person to give the appearance that an absent employee was in fact present, is discouraged. Since each employee is required to carry his identification card with him, insertion of another's identification card into the punch clock is not as likely to occur as when the cards are stored in a rack which is accessible to all. This advantage is not possible from a practical standpoint with the prior art time card system since it is not feasible to require employees to carry their time cards with them. The prior art time cards are too large to be conveniently carried in one's wallet or pocket and even if they were smaller are likely to become torn or otherwise damaged causing jamming or the like when inserted into the punch clock.

An additional advantage of this invention is that the embossed card is not easily duplicated without special equipment, making attempts to defeat the system very difficult.

A still further advantage of this invention is that the needs for printing and distributing individual time cards to employees on a weekly basis is eliminated. This invention requires little more than the insertion of a blank roll of tape into the recorder. The expensive and time consuming practice of printing time cards at a central location and mailing or otherwise distributing them to the various plant or departments each week is eliminated.

Another problem with the prior art proposals, particularly the punch clock, is that it is possible for two or more entries on a card to be made in the same place, thereby obscuring the entry altogether. Often an employee who is attempting to conceal a late arrival or early departure will insert his card into the punch clock two or more times. If the clock records in minute intervals and the entries are made during different intervals the entries are different and the record obscured for this reason. In many cases, however, even where the plural insertions are made during the same time interval, the record becomes obscured because the successive entries are not made precisely one over another. Such offset entries are possible because the insertion slot is slightly larger than the card, which is necessary to permit quick insertions and accommodate imperfectly sized cards, and permits the card to be positioned in the slot at a slightly different position when inserted the second time, causing the second entry to be offset from the first, obscuring the record.

In accordance with the principles of this invention this double entry problem is obviated by the utilization of a novel recorder design concept in which record advancing means are provided for advancing the record one increment following each entry. In this manner, each time a card is inserted and an entry made on the record tape, the tape automatically advances, preventing a second entry to be made over the first by successive card insertions. Thus, an employee can no longer obscure his original entry in an effort to keep his employer from knowing the exact time he arrived or left his place of employment.

Another problem with the prior art proposals, particularly with the system in which the remote key stations transmit entries to a central recorder in response to insertion of a coded key, is the complexity and initial cost of such installations. One of the principal factors contributing to such cost is the need for linking the remote key stations and the central station by suitable data transmitting equipment. Another reason for high initial cost is that expensive code readers involving complicated switch arrangements are required at each key station to facilitate the sensing of coded keys.

A further objective of this invention has been, therefore, to provide an employee work monitoring system which permits employee records to be processed at a central station, such as in the payroll department, but yet does not require a plurality of code readers nor electrical data transmitting means linking the remote plant entrances or sites and the central department.

The above objective is achieved in the preferred embodiment of this invention by recording the arrival and departure entries on paper tape at the point of card insertion. The tape can then be forwarded to the central data processing station by any suitable means, such as, by mail. Thus, remote processing is provided without the need for electrical data transmitting links between the key stations at the plant entrances and the central data processor. In addition, since the recording process comprises a printing operation, individual code readers at each key station are not required. Instead, a single code reader at the central record tape processing station is all that is necessary in the way of code reading equipment.

An additional problem, which is particularly prevalent with the punch clock system, is the ease with which it is possible to improperly insert the card into the punch clock as, for example, inserting the card upside down, and yet still be able to actuate the recording unit thereby producing a misplaced imprint on the card.

It has been, therefore, a further object of this invention to provide a recording system in which recording errors due to improper insertion of the card are eliminated. This object is achieved in accordance with the principles of this invention by removing a portion of the leading edge of the card. This removed portion, when the card is properly inserted into the recording unit engages a lug in the recorder, permitting the card to be fully inserted and the leading edge of the card to trip an actuating switch for operating the imprinting mechanism of the recorder. Should the card be oriented improperly, the lug and removed portion of the card do not align, thereby preventing the leading edge of the card from advancing into the slot the distance necessary to trip the switch and produce an imprint.

A further objective of this invention has been to provide a recording system which permits the record entries to be quickly and accurately processed. In accordance with the principles of this invention this objective is accomplished by the novel and unobvious concept of providing a coded embossment on the card which, when inserted into the recording unit, produces a machine readable pattern of photosensible marks on the record tape. Thus, the records of employee activity made in accordance with this invention readily adapt the system for, and make the system compatible with, existing electronic data processing equipment and techniques. For example, the imprinted employee record tape generated by the recording unit of this invention can be read and converted to punch tape and magnetic tape, as well as to punch cards, thereby enabling the employee time data to be placed in a variety of forms for use with existing peripheral computer input equipment such as magnetic and punch tape and card readers. Hence, the system of this invention facilitates the use of economical electronic data processing techniques in computing payrolls, etc.

In connection with the above objective, it has been an additional objective of this invention to provide tape reading means which are not adversely affected by ambient temperature changes. This objective is accomplished by utilizing a photosensing circuit of unique design in which the change in resistance of a photodiode, which is induced by a variation of reflected light as a result of the presence of a mark at the photosensing station, is capacitively coupled to an independently biased Darlington circuit. The capacitive coupling and independent biasing stabilize the magnitude of change in resistance of the photodiode required to switch the Darlington circuit transistors, thereby rendering the circuit insensitive to changes in the D.C. signal level of the photodiode circuit.

The various features and advantages of the invention will be more clearly apparent to those skilled in the art from the following description, taken in conjunction with the drawings.

Figures 15, 16:
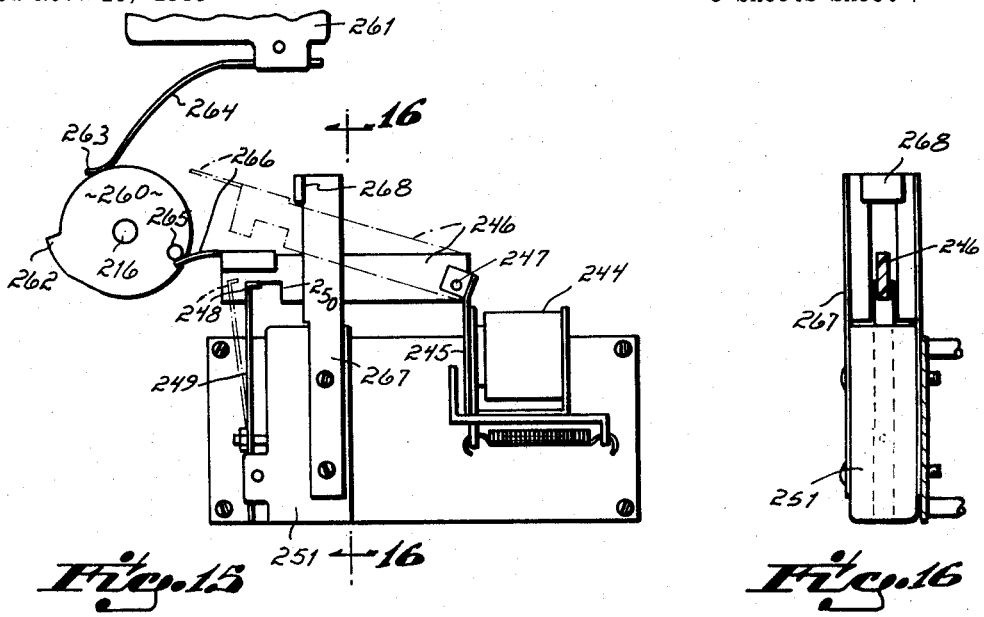
Figure 20:
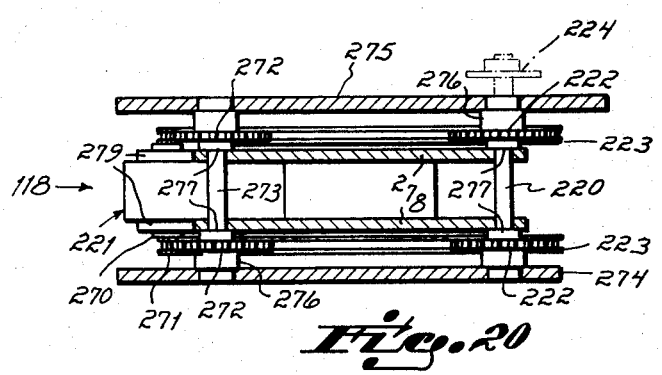
Figure 17:
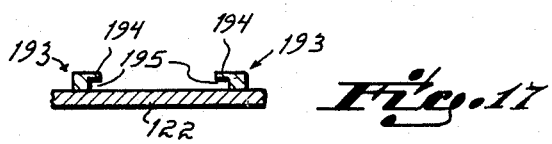
Figure 18:
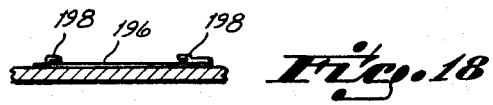
Figure 19:

In the drawings:

FIGURE 1 is a fragmentary plan view of an embossed employee identification card constructed in accordance with the principles of this invention and which is adopted for use with the recording unit, FIGURE 2 is a perspective view of a recording unit constructed in accordance with the principles of this invention, FIGURE 3 is a fragmentary plan view of a record tape taken along line 3—3 of FIGURE 2 showing a registration containing an imprinted facsimile of the information embossed on the card of FIGURE 1 and an imprint of the day and time of the registration, FIGURE 4 is a front elevational view in cross-section of the recording unit taken along line 4—4 of FIGURE 2, FIGURE 5 is a front elevational view in cross-section of the platen assembly taken along line 5—5 of FIGURE 7, FIGURE 6 is a plan view partially in cross-section of the print station taken along line 6—6 of FIGURE 5, FIGURE 7 is a side elevational view in cross-section of the platen assembly taken along line 7—7 of FIGURE 4, FIGURE 8 is a side elevational view in cross-section of the platen assembly taken along line 8—8 of FIGURE 4, FIGURE 9 is rear elevational view of the recording unit depicted in FIGURE 4 showing the drive assembly, FIGURE 10 is a side elevational view in cross-section taken along line 10—10 of FIGURE 9 showing the drive system for the tape feed mechanism, FIGURES 11 and 12 are front elevational views in cross-section both taken along line 11—11 of FIGURE 10 showing the tape feed mechanism in different operating positions, FIGURES 13 and 14 are side elevational views in cross-section taken along line 13—13 of FIGURE 10 showing the clutch actuating means, FIGURE 15 is a fragmentary rear elevational view of the microswitch actuating means depicted in FIGURE 9 showing the microswitch being deactuated subsequent to the completion of a print-out cycle, FIGURE 16 is a side elevational view in cross-section taken along line 16—16 of FIGURE 15, showing the microswitch of FIGURE 15 in more detail, FIGURE 17 is a side elevational view in cross-section taken along line 17—17 of FIGURE 6, showing a portion of the tape guide, FIGURE 18 is a side elevational view in cross-section taken along line 18—18 of FIGURE 6, showing a further portion of the tape guide, FIGURE 19 is a side elevational view in cross-section taken along line 19—19 of FIGURE 6, showing a still further portion of the tape guide, FIGURE 20 is a plan view in cross-section taken along line 20—20 of FIGURE 4 showing the platen assembly, FIGURES 21 and 22 are schematic circuit diagrams of a tape reader constructed in accordance with the principles of this invention, and FIGURE 23 is a plan view of a punch card adapted to have punched therein the information on the tape which is read by the reader of FIGURES 21 and 22.

CARD

The preferred embodiment of a card suitable for operating in conjunction with the printing unit depicted in FIGURES 2, and 4–19 is shown in FIGURE 1. The card 106 is substantially rectangular in shape having a leading edge 141 and a trailing edge 134, and left-hand and right-hand edges 138 and 139 respectively. An off-center portion N of the leading edge 141 is removed and cooperates with a suitably positioned element in the printer to be described for preventing insertion of the card into the printer upside down. The card is preferably made of semi-rigid material, such as permanently deformable plastic or sheet metal stock, which is suitable for embossment in accordance with well-known techniques.

The card contains thirty-six index positions arranged in a six-by-six matrix grid pattern. Each vertical column is suitable for embossing the coded representation of one digit in a conventional two-out-of-six code, as well as embossing the Arabic numeral representation of the digit. The card depicted in FIGURE 1, for example, bears an embossment in a two-out-of-six code of the digital employee number 739194, as well as the Arabic numerals 739194. Specifically, column one bears coded embossments in track one and in track two constituting the two-out-of-six code designation for the digit 7; column two bears coded embossments in track four and track five corresponding to the digit 3; column three bears coded embossments in track two and track three and corresponding the coded digit 9; column four bears coded embossments in track one and track five corresponding to the coded digit 1; column five bears embossments in track two and track four corresponding to the digit 9; and column six bears embossments in track one and track three corresponding to digit 4. In addition, columns one-six of track six bear the Arabic numerals 7, 3, 9, 1, 9, and 4, respectively providing a humanly intelligible representation of the employee's coded identification number.

PRINTING UNIT

A printing unit suitable for use with the system of this invention includes an enclosure 101 which is adapted to house the operating mechanisms of the printing unit. The enclosure 101 is provided with a lock 102 for preventing unauthorized personnel from having access to the printing unit, thereby avoiding theft or multilation of the record tapes, tampering with the time and date stamping mechanism, or other acts calculated to interfere with the proper operation of the printing unit. The enclosure 101 is further provided with a plurality of slots 103, 104 and 105. The slot 103 permits an employee to insert and properly register his identification card 106 in a suitable cardholder 107 which projects through the aperture 103, for the purpose of producing a record or imprint containing his coded employee identification number as well as the current date and time. Such an imprint on the record tape of the employee's identification number, the date, and time is termed a registration. The slots or apertures 104 and 105, which are suitably masked with glass, enable the employee to visually inspect the record or imprint on the record tape produced as a consequence of having inserted the identification card 106 into the cardholder 107. The glass which masks the apertures 104 and 105 serves to prevent access to the record tape by unauthorized personnel in a manner which does not, at the same time, interfere with the visual inspection of the record tape.

The printing unit, as shown in FIGURE 4 with the cover partially cut away, includes a frame having a base 108 and a vertical rear support member 109 to which are mounted in operative relationship the various elements comprising the operating mechanisms of the printing unit. These elements, more specifically, include a time and date print unit 110 mounted in juxtaposed relationship to the cardholder 107. Also forming part of the operating mechanism of the printing unit is a record tape feed assembly 111. The feed assembly 111 functions to feed in synchronism with the imprinting operation, the record tape 112 from a tape supply roll 113 to a pair of tape storage rolls 114 and 115 upon which are stored the duplicate record tapes 116 and 117. Also comprising the operating mechanism is a platen assembly 118. The platen assembly 118 is mounted above the cardholder 107 and the time and date unit 110, and, in cooperation therewith, produces on the record tape 112 which is fed therebetween an imprint or registration 119 of the information 121 appearing on the identification card, as shown in FIGURE 3, as well as an imprint 120 of the current time and date as shown more clearly in FIGURE 6. Included in the recording unit and to be fully described below is a suitable drive assembly for powering the various elements of the operating mechanism in response to the insertion of a card 106 into the cardholder 107.

The cardholder 107, as more particularly shown in FIGURES 4–8, includes an oddly configured number 126 having a depending portion 127 and front and rear horizontally extending portions 128 and 129, respectively. The cardholder is mounted on a horizontal shelf 122 which has a removed portion 130 adapted to receive the rear horizontal cardholder portion 129. The upper surface of the rear portion 129 of the member 126 is flush with the upper surface of the horizontal shelf 122 and the upper surface of a pressure plate inlay 131, the function of which will be described later. These flush surfaces in combination provide a smooth support for a card 106 positioned in the cardholder 107.

To insure proper registration of the card 106, card positioning elements are provided. More specifically, the card positioning elements include a pair of vertically extending shoulders 132 and 133 formed on the front horizontal portion 128 of the member 126. Collectively, the shoulders 132 and 133 function to position the trailing edge 134 of the card 106. The card positioning elements further include side bars 135 and 136, 137 for positioning the left-hand and right-hand sides of the card 138 and 139, respectively, and a rear bar 140 for positioning the leading edge 141 of the card 106. A forwardly extending off-center registration lug L is formed on the rear bar 140. This lug engages the notch N of a properly inserted card 106, preventing insertion of the card upside down. A horizontal overhanging flange 142 formed on the inside vertical surface 143 of the side bar 135 is provided to limit the upper movement of the left-hand edge 138 of the card 106 when the card is inserted in the cardholder 107. A portion 144 of the oddly configured member 126 is removed to permit the card to be gripped between the thumb and forefinger, thereby facilitating insertion and withdrawal of the card 106 from the cardholder 107.

A card clamp 123 is provided to positively grip the card 106 during an imprinting cycle, thereby preventing premature withdrawal of the card, that is, preventing withdrawal prior to completion of the imprinting operation. The card clamp 123 includes a vertical reciprocable L-shaped bracket 124 connected at its lower end by a spring 125 to an armature 148 of a stationary solenoid 149. The bracket 124 at its upper end has a horizontally extending lip portion 150 which overhangs the edge 138 of the card 106. In operation, the solenoid 149 is energized during the imprinting cycle by means to be described. The energization of the solenoid 149 retracts the armature 148, urging the bracket 124 downwardly, causing the overhanging portion 150 to grip the left edge 138 of the card 106. The gripping action results from sandwiching the card edge 138 between the lower surface of the overhanging portion 150 and the upper surface of the shelf 122. The spring 125 prevents the card from being damaged as a result of this gripping action.

As mentioned above, the time and date print unit 110 is mounted to the under surface of the horizontal shelf 122 in juxtaposition to the cardholder 107 and may be of any of the types well-known in the art. Preferably, the time and date print unit 110 includes one date print wheel 151, and three time print wheels 152, coaxially mounted for rotation about a common shaft 153. The date wheel 151 includes the numbers 1, 2, 3, 4, 5, 6, 7 corresponding to the seven days of the week. The time wheels 152 are appropriately numbered to permit recording the time by the hour and decimal part thereof, such as, 09.5 corresponding to 9:30 A.M., 23.8 corresponding to 11:48 P.M., etc. A stationary asterisk wheel 146 is positioned on the left-hand side of the date wheel 151 for providing a coded imprint of the asterisk symbol between the coded date and employee identification digit imprints produced by the date wheel 151 and the card embossment 121, respectively. A stationary dash wheel 147 is positioned on the right-hand side of the time wheels 152 for providing a coded imprint of the dash symbol following the coded time imprint produced by the time wheel. The wheels 146, 147, 151 and 152 include both the symbol or digit, as well as, the code representing the symbol or digit, thereby producing imprints of the symbols or digits, as well as, the coded representations thereof.

The shaft 153 is supported at its ends by a pair of vertical legs 154, 155 forming a part of L-shaped members 156, 157 respectively, which have their horizontally extending flanges 158, 159 secured to the horizontally extending shelf 122 by fasteners 160. The time and date print wheels 152 and 151, respectively, are advanced by suitable means (not shown in detail) such as a Geneva transfer mechanism, in a manner such that the uppermost print surfaces of the print wheels at all times register the proper time and date. A rectangular aperture 161 is formed in the horizontal shelf 122 and permits the uppermost print surfaces of the print wheels 146, 147, 152 and 151 to protrude above the upper surface of the horizontal shelf 122, thereby facilitating the imprinting of the asterisk, dash, time, and date on the record tape 112 in a manner to be described later. Collectively, the uppermost print surfaces of the asterisk, dash, time and date print wheels 146, 147, 152 and 151, in conjunction with the information 121 embossed on the surface of the card 106 inserted in the cardholder 107, define a print station.

The tape supply roll 113 is mounted for rotation about a shaft 162 and serves to supply the record tape 112 to the print station. To store the duplicate record tapes 116 and 117 which are drawn past the print station by the tape feed assembly 111 the pair of tape storage rolls 114, 115 are provided. The tape storage rolls 114, 115 are mounted for rotation with shafts 163 and 165, respectively, and are driven by a storage roll drive assembly including a drive sprocket 164 connected to the shaft 170 of a motor 166 and a drive chain 167 trained over the drive sprocket 164 and the driven sprockets 168 and 169 which are secured to the shafts 163 and 165, respectively.

The tape feed assembly 111, which advances the tape 112 past the print station, includes a drum 176 mounted for rotation with a shaft 177 and a pressure roll 178 mounted for rotation with a shaft 179. The shafts 177 and 179 are supported at their right end, as viewed in FIGURE 10, by a plate 180 which is mounted in spaced parallel relationship with respect to the vertical rear support member 109 by a plurality of sleeves 181 in combination with a plurality of cooperating fasteners 182 which secure the sleeves 181 in a sandwiched relationship between the vertical rear support member 109 and the plate 180. The lefthand end of the shaft 179 and an intermediate section of the shaft 177 are supported for rotation in journal bearings formed in the vertical rear support member 109. The drum 176 has its entire periphery, except for an angular portion designated A, covered with the rubber pad 182. The outer peripheral surface of the pad 182, in cooperation with a pair of spaced rubber rings 183 which securely embrace peripheral grooves on the pressure roll 178, grip the tape 112 positioned therebetween, advancing the tape 112 as the drum 176 rotates through the angles designated B and C.

Secured to both sides of the drum 176 for rotation therewith are a pair of gears 184. Meshing with the gears 184 and driven thereby are gears 185 which are positioned on opposite sides of the pressure roll 178 and secured to the shaft 179. The gears 184 and 185 in combination insure that the tangential velocity of the rubber rings 183 and the rubber pad 182 are equal thereby avoiding the feeding of the duplicate tapes 116 and 117 at different rates. A pair of tension springs 186 connecting the ends of the shaft 179 to stationary pins 187 urge the rubber ring 183 into engagement with the rubber pad 182 providing the desired gripping force for advancing the duplicate record tapes 116, 117 which are fed therebetween.

A central notch 190 in the upper surface of the side bar 135 is provided to guide the record tape 112 as it enters the print station. The tape 112 is maintained in the notch 190 by a cover plate 192 which is secured to the upper surface of the bar 135, as shown in FIGURE 19. A pair of spaced parallel bars 193 having inwardly projecting overhanging portions 194 are mounted to the upper surface of the shelf 122 to guide the record tape 112 from the print station to the feed assembly 111, as shown in FIGURE 17. The tape 112 which is positioned between the interior lower vertical surfaces 195 of the guide bars 193 is prevented from moving upwardly by the overhanging portions 194 of the guide bars.

Also utilized to guide the record tape 112 from the print station to the feed assembly 111 is a guide strip 196. The guide strip 196 is mounted at its left end to the upper surface of the horizonal shelf 122 by fasteners 197. The lateral marginal portions of the guide strip 196 are bent back over themselves forming inwardly extending lips 198. The lips 198 function in the same manner as the overhanging portions 194 of the guide bars 193 to limit the vertical movement of the record tape 112 which is positioned between the vertical portion of the lips, as shown in FIGURE 18. A leaf spring 199 over which the record tape passes is positioned transversely of the record tape feed path and secured at its rear end to the upper surface of the horizontal shelf 122. The spring 199 functions to resiliently maintain the record tape 112 in noncontacting relationship to the uppermost print surfaces of the print wheels 146, 147, 151 and 152.

The drive assembly for powering the platen assembly 118 and the tape feed assembly 111, as shown in FIGURES 4, 9 and 10, includes a motor 201 having a drive sprocket 202 over which is trained a drive chain 203 for imparting motion to a driven sprocket 204. The driven sprocket 204 is keyed to a shaft 205 which is supported for rotation by the vertical support member 109 and the plate 180. More specifically, a journal bearing 207 mounted in the plate 180 supports the shaft 205 at its outer end 206 and a journal bearing 208 mounted in the vertical support member 109 supports the shaft 205 at a point intermediate the ends of the shaft. Keyed to the other end 209 of the shaft 205 is a gear 210, which, when driven by the shaft 205, drives a gear 211. The gear 211 is selectively coupled to the shaft 177 by a solenoid operated clutch 212 to be described. With the clutch 212 engaged, the gear 211 drives the shaft 177, and tape feeding motion is imparted to the feed drum 176 from the motor drive sprocket 202 via the drive chain 203, driven sprocket 204, shaft 205, gears 210 and 211, and shaft 177.

Keyed to the shaft 177 for receiving motion therefrom is a gear 214. The gear 214 meshes with an idler gear 215 which is mounted for rotation about a shaft 216. The idler gear 215 in turn meshes with a gear 217 which is integral with a gear 218. Both of the gears 217 and 218 are mounted for rotation about a shaft 219. Meshing with the gear 218 is a gear 224 which is keyed to the shaft 220 for imparting motion to the platen print roller wheel 221 (FIGURE 5 and 21) via the sprockets 222 and the drive chains 223. Thus, with the clutch 212 engaged and the gear 211 coupled to the shaft 177 motion is imparted from the motor 201 to the platen wheel 221 via the drive sprocket 202, drive chain 203, driven sprocket 204, shaft 205, gears 209 and 211, shaft 177, gears 214, 215, 217, 218, and 224, shaft 220, sprockets 222 and drive chains 223.

The clutch 212 may be of any of the conventional types for selectively engaging two ratatable members and may, for example, be a spring clutch of the type shown in FIGURES 10, 13, and 14. More specifically, the spring clutch 212 includes a cylinder 226 which is rotatably mounted in a pair of parallel vertical supports 227 and is coaxial with and cirumscribes the end portion of the shaft 177. A spring member (not shown) is positioned within the cylinder 226 releasably engaging the cylinder 226 and the end of the shaft 177 in a manner well known in the spring clutch art. A horizontal bar 228 which has its ends 229 slidably mounted in vertical slots 230 in the vertical supports 227 selectively engages at its upper edge a longitudinal rib 231 formed on the cylinder 226, to effect the selective engagement and disengagement of the clutch 212.

Specifically, when the bar 228 is urged into the uppermost position by the spring 233, the cylinder 226 is prevented from rotating and the clutch 212 is in the disengaged position. Hence, the shaft 177 is not driven and the feed assembly 111 and the platen assembly 118 receive no power from the motor 201. When the horizontal bar 228 is in the lowermost position due to the energization of the solenoid 234, the cylinder 226 is free to rotate placing the clutch 212 in the engaged position and thereby transmitting motion from the motor 201 to the feed assembly 111 and the platen assembly 118.

To synchronize the operation of the various mechanisms comprising the printing unit for the production of a record 200 in response to the insertion of a card 106 into the cardholder 107, control means are provided. The control means include a microswitch 240 mounted beneath the horizontal shelf 122 to the front surface of the vertical support member 109, as best shown in FIGURE 7. The microswitch 240 is provided with an actuating arm 241 which is pivotally connected at its lower end to the switch. The free end 242 of the actuating arm 241 projects above the top surface of the shelf 122 through a slot 243 formed in the shelf 122. The actuating arm 241 pivots clockwise, as viewed in FIGURE 7, actuating the switch 240 and energizing the motor 201 when the end 242 of the actuating arm is urged to the right by the leading edge 141 of a card 106 being inserted into the cardholder 107. The motor 201, however, does not impart driving motion to the platen assembly 118 or the tape feed assembly 111 until the clutch 212 is actuated.

A switch 252 which projects upwardly from a cavity 253 formed in the member 126 is in abutting relationship with the trailing edge 134 of a properly inserted card 106. The switch 252 is adapted to be tripped when the card 106 is fully inserted and its trailing edge 134 depressed. When tripped, the switch 252 energizes an electromagnet 244 mounted on a plate 235 which is secured to and spaced from the vertical rear support 109. The energization of the electromagnet 244 attracts a spring biased arm 245 pivoting the arm clockwise about its lower end, as viewed in FIGURE 9. A notched lever 246 is pivotally connected at one end by a pin 247 to the arm 245 and has a notch 250 on its free end. The pivoting of the arm 245 transmits motion to the notched lever 246 through the pivot pin 247. The translation of the lever 246 in turn urges a free end 248, captured in the notch 250, of an actuating arm 249, causing the actuating arm 249 to pivot about its lower end thereby actuating the microswitch 251. The actuation of the microswitch 251 is effective to energize the solenoid 234, engaging the clutch 212 and thereby effecting the transmission of power from the motor 201 to the tape feed assembly 111 and the platen drive assembly 118, the motor 201 already having been energized by the tripping of the switch 240 which projects upwardly in abutting relationship with the leading edge 141 of a properly inserted card 106. The actuation of the mircoswitch 251 is also effective to energize the solenoid 149 of the card clamp 123, causing the armature 148 and rod 124 to drop, clamping the card 106.

A cam 260 is mounted on the shaft 216 for rotation with the gear 215. The cam 260 in conjunction with a microswitch 261 controls the energization of the tape drive assembly motor 166 which in turn controls the rotation of the tape storage rolls 114 and 115. More specifically, a lobe 262 formed on the periphery of the cam 260 moves from beneath the free end 263 of the actuating arm 264 of switch 261 allowing the actuating arm 264 to pivot counterclockwise, as viewed in FIGURE 9, about its upper end causing switch 261 to be actuated. Switch 261, in turn, energizes the tape drive assembly motor 166 imparting motion to the tape storage rolls 114 and 115. Since the movement of the lobe 262 from beneath the end 263 of the actuating lever 264 occurs concurrently with the driving of the tape feed assembly 111 and the platen assembly 118, synchronization of the printing, feed and storing operation is achieved.

A pin 265 mounted to the cam 260 and extending axially therefrom in conjunction with a horizontal extension 266 formed on the free end of the notched lever 246 de-energizes the switch 251 at the end of a recording cycle independent of the presence or absence of the card 106 in the cardholder 107 thereby preventing the production of two record imprints 200 on the same section of the record tape 112. It will be remembered that the switch 251 is energized by the clockwise pivoting of the actuating arm 249 about its lower end in response to the rightward translation of the notched lever 246 which engages the free end 248 of the arm. It will be further remembered that the lever 246 is urged rightwardly when the electromagnet 244 is energized in response to the insertion of the card 106 into the cardholder 107. Thus, it would normally be expected that the switch 251 would remain energized as long as the card 106 remains inserted in the cardholder 107. However, such continued energization of the switch 251 is prevented by the coaction of the pin 265 with the extension 266.

Specifically, as the pin 265 moves clockwise about the shaft 216 it abuts the upper surface of the extension 266, prior to completing one revolution, and upon further rotation deflects the extension 266 as shown in FIGURE 15. This deflection, when the pin 265 is eventually rotated past and out of contact with the extension 266, causes the lever 246 to snap pivoting clockwise about the pin 247 to the extent permitted by a guard member 267, the upper portion 268 of which extends into the path of the pivoting lever 246 limiting its pivotal motion.

When the lever 246 has pivoted a specified amount, which is less than the maximum pivotal motion permitted by the upper portion 268 of the guard member 267, the free end 248 of the actuating arm 249 of switch 251 disengages the notch 250 permitting the arm 249 to pivot counterclockwise about its lower end de-actuating the switch 251. The de-actuation of the switch 251 de-energizes the solenoid 234 disengaging the clutch 212 and removing power from the tape feed assembly 111 and the platen assembly 118. Upon disengagement of the clutch 212, the cam 260 coasts to a stop in the position shown in FIGURE 9. In the stopped position, the lobe 262 of the cam 260 is positioned beneath the free end 263 of the lever 264 of switch 261 thereby deactuating the switch 261 which in turn de-energizes the motor 166 bringing the tape storage rolls 114 and 115 to a rest position.

The de-actuation of the switch 251 also de-energizes the solenoid 149 of the card clamp 123, allowing the rod 124 and armature 148 to rise, unclamping the card 106, and thereby permitting its withdrawal.

The platen assembly 118 includes the platen roll or wheel 221 which is adapted to be drawn across the print station urging the record tape 112 into contact sequentially with the embossed information 121 on the card 106 and the uppermost characters on the print wheels 146, 147, 152 and 151, thereby producing the imprint or registration 200 in duplicate on the record tapes 116 and 117. The platen roll 221 is mounted for rotation about a shaft 270 which is secured at its ends to oppositely disposed links 271 of the endless drive chains 223. Each of the two chains 223 is trained over one of the pair of spaced driven sprockets 222 mounted for rotation with the shaft 220 which has its end journalled in a frame 274 and an intermediate portion thereof journalled in a frame 275. The endless chains 223 are also trained over one of a pair of spaced driven sprockets 272 mounted on a shaft 273 which is supported at its ends in journals mounted in the parallel spaced platen supports 274 and 275. The sprockets 222 and 272 are spaced from the frames 274 and 275 by spacers 276 mounted on the shafts 273 and 220 intermediate the sprockets and the frame members. Additionally, the sprockets 222 and 272 are spaced apart on their respective shafts 220 and 273 by spacers 277 mounted on the shafts intermediate the inside surfaces of the sprockets and the exterior surfaces of a pair of spaced parallel guide bars 278. The guide bars are mounted at their opposite ends to the shafts 220 and 273 and separated by a spacer 280.

The peripheral surfaces of a pair of guide rolls 279 mounted on the shaft 270 on opposite sides of the platen roll 221 remain in rolling contact with the peripheral surfaces of the guide bars 278 as the chains 223 draw the platen roll 221 through a printing cycle. The guide bars 278 are provided to insure a rolling pressure relationship between the platen roll 221 and the characters to be imprinted as the platen wheel 221 is drawn across the print station.

As best seen in FIGURES 4 and 7, a lower intermediate portion of the frame 274 is removed to accommodate a card guide plate 280 which is mounted at its upper edge to the frame 274. The card guide plate 280 is rearwardly and downwardly sloping forming, with the upper surface of the member 126, a mouth into which the card 106 may be easily inserted into the cardholder 107. The lower edge of the card guide plate 280 terminates at the forward edge of the flange 142 thereby insuring that the card 106 when inserted will have its edge 138 positioned beneath the flange 142.

In operation, the production of a record 200 bearing a time and date imprint 120 and an identification imprint 119 is produced by inserting the card 106 into the cardholder 107. The insertion of the card 106 properly into the cardholder 107 automatically draws the platen roll 221 across the print station, feeds the record tape 112, and rotates the tape storage rolls 114 and 115. More specifically, to produce a record 200, the card 106 is inserted into the cardholder 107, the leading edge 141 being inserted first. When the card is properly positioned, the edges 141 and 134 abut the guide bar 140 and the shoulders 132, 133, respectively, the lug L seats within the card notch N, and the edges 138 and 139 abut the guide bars 135, and 136, 137, respectively. In addition, the information 121 on the card 106 is positioned over the pressure plate inlay 131 and the edge 138 is positioned beneath the flange 142 and the overhang 150 of the clamping rod 124. With the card 106 so positioned, the record tape 112 is disposed parallel to and above the card 106.

In the course of properly positioning the card 106 the leading edge 141 abuts the free end 242 of the actuating arm 241 of switch 240 pivoting it clockwise about its lower end thereby actuating the switch 240 which is effective to energize the motor 201. The energization of the motor 201 does not, as this time, result in the application of power to the tape feed assembly 111 or the platen assembly 118 inasmuch as the clutch 212 is de-energized. Consequently, the energization of motor 201 merely drives the sprocket 204, shaft 205, and mating gears 210 and 211.

Also, in the course of properly positioning the card 106, the marginal portion of the card adjacent the edge 134, when the card 106 lies flat in the cardholder 107, actuates the switch 252. The actuation of the switch 252 is effective to energize the electromagnet 244 pivoting the arm 245 clockwise about its lower end which in turn translates the lever 246 pivoting the actuating arm 249 clockwise about its lower end energizing the switch 251. The energization of switch 251 in turn energizes the solenoid 234 engaging the clutch 212. With the clutch 212 now engaged the drive gear 211 is coupled to the shaft 177 imparting motion to the drum 176 directly and to the pressure roll 178 indirectly through the gears 184, 185 and the shaft 179. In addition, when the clutch 212 in energized the gear 214, which is keyed to the shaft 177, is driven imparting motion to the platen roll 221 via the gears 215, 217, 218 and 224, the shaft 220, the sprockets 222, the drive chains 223, and the shaft 270. Since the engagement of the clutch 212 drives the gear 215, the cam 260 rotates moving the lobe 262 from beneatth the free end 263 of the actuating arm 264 of switch 261, energizing switch 261 which, in turn, energizes the motor 166 thereby driving the tape storage rolls 114 and 115.

In addition, energization of the switch 251 energizes the card clamping solenoid 149. Energization of the solenoid 149 draws the rod 124 downward to clamp the inserted card between the overhanging lip 150 and the shelf 122. Thus, the card is positively held in place to prevent its withdawal once a printing cycle is initiated.

At the instant the clutch 212 becomes engaged as an indirect consequence of actuation of switch 252, the feed drum 176 is in the position shown in FIGURE 11 and the platen roll 221 is in the position $P_0$ shown in FIGURES 5, 7, and 8. These positions are the positions to which the drum 176 and the platen wheel 221, respectively, have coasted when the clutch 212 was disengaged at the end of the previous cycle. Movement of the platen roll 221 and the feed drum 176 from these initial positions is first characterized by an advancement of the platen roll 221 from the position $P_0$ to the position designated $P_1$ (see FIGURE 5) wherein the platen roll is about to initiate the printing of the information 121 of the card 106, and by the rotation of the drum 176 through the angle C, as shown in FIGURES 11 and 12, wherein some limited feeding of the record tape 112 occurs. Continued rotation of the platen wheel 221 to the position $P_2$ of FIGURE 5 draws the platen wheel into printing relationship with the embossed information 121 on the card 106 and the asterisk, dash, time and date print wheels 146, 147, 152 and 151, respectively, producing an imprint 119 of the information 121 on the card 106 and an imprint 120 of the asterisk, time and date and dash, the two imprints together comprising registration 200.

The platen roll 221 in the course of its movement into printing relationship with the print wheels 151 and 152 passes between the internal ends of the guide bars 136 and 137 and depresses the leaf spring 199 which spaces the tape 112 above the shelf 122 to insure that a card is always inserted below the tape.

As the platen roll 221 is being drawn through the print station producing the registration 200, the feed drum 176 rotates through the angle designated A in FIGURES 11 and 12. During this angular rotation no feeding of the record tape 112 occurs due to the absence of the rubber pad 182 on the periphery of the drum 176. Thus, during the printing of the record 200, the record tape 112 is stationary.

Following the imprinting phase of the cycle, the platen roll 221 and the feed drum 176 continue to rotate. Specifically, the platen roll 221 rotates from position $P_2$ to position $P_0$ and the feed drum 176 rotates through the angle B feeding the tape. These rotations continue until the pin 265 on the cam 260 pivots below the spring extension 266 and snaps the lever 246 clockwise releasing the actuating arm 249 which de-energizes the switch 251, de-energizing the solenoid 234 and disengaging the clutch 212. When the clutch 212 becomes disengaged power is removed from the platen assembly 118 and the tape feed assembly 111. The platen roll 221 coants to a stop in position $P_0$, and the feed drum 176 coasts to a stop in the position shown in FIGURE 11, having completed rotation through the angle B during which time the tape is fed. The motor 166, which drives the tape storage rolls 115 and 116, is de-energized concurrently with the coming to rest of the platen roll 221 and the feed drum 176 due to the repositioning of the lobe 262 of the cam 260 beneath the free end 263 of the actuating arm 264 of switch 261, which functions to de-actuate the switch 261, de-energizing the feed motor 166, and terminating the tape feeding cycle.

The de-actuation of the switch 251, also de-energizes the solenoid 123, allowing the rod 124 to rise, releasing the card edge 138 and thereby permitting the card 106 to be withdrawn. Removal of the card 106 from the cardholder 107, although not necessary for terminating the motion of the platen roll 221, the tape feed assembly 211, and the tape storage roll drive motor 166, is required to de-energize the motor 201 and the electromagnet 244. Upon removal of the card 106 from the cardholder 107 the switches 250 and 252 are de-actuated, de-energizing the motor 201 and the electromagnet 244, respectively. De-energiaztion of electromagnet 244 in turn causes the arm 245 to pivot counterclockwise about its lower end translating the lever 246 leftwardly and positioning the free end 248 in the notch 250 thereby readying the control means for the next imprinting cycle.

The record tape 112, while it may take a variety of suitable forms, is preferably a pressure sensitive recording medium. Such pressure sensitive material produces a visible mark when subjected to pressure, as, for example, occurs when the platen roll 221 urges the record tape 112 against the embossed card 106 and the print wheels 146, 147, 151 and 152.

The card 106, when inserted into the printing unit with the leading edge 134 first, produces the print-out depicted in FIGURE 3. This print-out includes a record or facsimile 119 of the coded embossment pattern 121 present on the card 106. In addition, it includes the day and time digits and codes therefor, the asterisk symbol and code therefor separating the employee identification number and the day, and the dash symbol and code therefor in the last column of the registration 200, all of which are indicated by the numeral 120.

The direction of tape feed in the printer is in the direction of arrow 610 (FIGURE 3). Hence, when the reel upon which the imprinted tape is wound is fed through the tape reading unit, to be described, the direction of tape feed is in the opposite direction, that is in the direction of arrow 611. Consequently, in the tape reading process the two-out-of-six code representation of the digit 7 will be sensed first, the coded digit 3 will be sensed second, the coded digit 9 will be sensed third, etc., until the coded dash symbol is sensed indicating that the last column of the registration has been read.

Instead of the notch N positioned as shown in FIGURE 1, and the cooperating lug L, it is contemplated that a notch may be positioned in the upper right hand corner of the card 106. The exact position of the notch in this alternative scheme is such that if the card 106 is inserted in the cardholder 107 upside down with the leading edge 141 first the notch is located directly opposite the switch actuating arm 241 thereby preventing the leading edge of the card 141 from imparting actuation motion to the arm 241 upon insertion. With a notch so positioned, when the card 106 is properly inserted into the cardholder 107, that is with the embossments facing up and the leading edge 141 first, the leading edge of the card will trip the switch 241 since no notch is formed in the leading edge at a point opposite the actuating arm 241.

READING UNIT

A tape reader suitable for use in the preferred embodiment of the invention is depicted in FIGURES 21 and 22. In general, the reader includes a photosensing station 300 provided with six independent channels or tracks 301–306. Each of the channels or tracks 301–306 is responsive to a separate and independent recording channel on the tape. Specifically, tracks 301–306 are responsive to tracks 1–6 on the recording tape, respectively. The channels 301–306 are arranged in a row transverse to the direction of motion of the tape through the photosensing station thereby providing a serial-by-digit, parallel-by-mark reading of the coded registration imprint present on the tape.

The preferred embodiment of the tape reader further includes an amplifying section 308 having six separate and independent amplifiers 309–314. The amplifiers 309–314 are responsive to the outputs 381 (a) and 381 (b)-386 (a) and 386 (b) of the photosensing channels 301–306, respectively, thereby retaining the separate and independent nature characterizing the multichannel photosensing arrangement. Also forming part of the preferred embodiment of the tape reader is a digital decoding matrix 318. The matrix 318 is responsive to the outputs 418–424 of the amplifying section 308 and functions to convert the information on the tape, which is coded in accordance with a two-out-of-six code, to digital form. A solenoid driving circuit 320 forms a further portion of the preferred embodiment of the tape reader. The solenoid driver circuit 320 has a plurality of solenoid drivers 321–332 corresponding in number and individually responsive to the outputs 431–442 of the decoding matrix 318. The solenoid drivers function to provide, in response to the digital outputs 431–442 of the decoding matrix 318, pulses on lines 467–478 of a predetermined level to a card punching apparatus 335 for energizing the appropriate punches therein for producing perforations in a punch card at the appropriate index positions corresponding to the digital outputs.

Additionally, the preferred embodiment of the tape reader includes a counter 340 responsive to the presence on the tape of the coded imprint corresponding to the dash symbol forming the last imprint of the registration. The counter 340 is a six position unit that provides an output on line 341 to the card punching apparatus 335 coincident with the reading of every sixth dash symbol for actuating a card advance mechanism (not shown) forming a part of the card punching apparatus. The recording capacity of each card is six registrations. Hence, the six position counter 340, by providing an output on line 341 at the end of reading the sixth registration, functions to properly synchronize card feeding in the punching apparatus 335 with tape feeding in the reader.

A lost digit detector generally indicated by the numeral 345 also forms a portion of the preferred embodiment of the tape reader. The lost digit detector 345 functions to provide a signal for stopping the tape reading operation when a registration not having the required twelve digits has passed through the photosensing station thereby preventing a card having an erroneous registration recorded thereon from being output from the card punching apparatus 335. The lost digit detector 345 accomplishes this function by checking for the coincidence of the dash symbol, which occurs at the end of each registration, and the presence of a check pulse generated by the card punching apparatus 335 in synchronism with the passing of every twelfth column of the card past the punching station of the card punching apparatus 335. Should a dash symbol occur at a time other than in coincidence with the presence of a check pulse, the lost digit detector produces an output on line 346 to a stop tape circuit 347. The stop tape circuit 347 functions to terminate the tape feeding operation.

Also included are suitable power supplies 350–352 for providing power to the various components of the tape reader.

In operation, the tape is driven past the photosensing station 300 enabling the photosensing channels 301–306 to sense the marks on a parallel-by-mark, serial-by-digit basis. The output on lines 381–386 for each digit, there being two outputs on different lines per digit, are input to their associated amplifiers 309–314, respectively, where the outputs of the various photosensing channels are amplified. The amplified signals are then input to the digital decoding matrix 318 where they are decoded, providing digital outputs on lines 431–442 to the respective solenoid drivers 321–332. The solenoid drivers, in turn, provide outputs on lines 467–478 to the card punching apparatus 335 for activating the appropriate punches, thereby punching the sequentially read and decoded digits in successive columns of the card.

As the sixth dash symbol is input to the counter 340 corresponding to the completion of the reading of six registrations, an output is generated on line 341 to the card punching apparatus 335 for stacking the completed card and advancing a new card. In the course of reading and decoding the digits of the registrations, should a registration having less than all of the required twelve digits be present, the lost digit detector will generate an output on line 346 to the stop tape circuit 347 for terminating the tape feeding operation, thereby preventing the card punching apparatus 335 from passing to the stacker a card having an erroneous registration recorded thereon.

The photosensing station 300, more specifically, includes a set of six lamps 361–366 which cooperates with a set of six photodiodes 367–372, respectively. Each of the cooperating lamp-diode combinations constitutes one of the independent channels or tracks 301–306 of the photosensing station 300. Specifically, lamp-photodiode pairs 361 and 367, 362 and 368, 363 and 369, 364 and 370, 365 and 371, 366 and 372, correspond to the channels 301–306, respectively. The lamps 361–366 and the photodiodes 367–373 are arranged in transverse rows on the side of the tape bearing the marks. The photodiodes 367–372 of each channel are geometrically located relative to the lamps 361–366 in a manner such that they are responsive to the light generated by their respective lamps which is reflected from the tape. With such an arrangement, the light incident on the photodiodes 367–372 is modulated by the marks on the tape constituting the imprinted registration, less light being reflected by the tape and incident on the photodiode when a mark is present at the point of intersection of the beam and tape and more light being reflected by the tape and incident on the photodiode in the absence of a mark at the point of intersection of the beam of light and the tape.

In the event that the transverse dimensions of either the lamp or the photodiode or both exceeds the width of a tape channel or track, adjacent lamps and photodiodes may be staggered. That is, the group of lamps, as well as the group of photodiodes, may each be divided into two transverse rows with alternate lamps and alternate photodiodes being placed in different ones of the two rows of lamps and the two rows of photodiodes, respectively. With such an arrangement the angles of incidence and reflection, while being the same for alternate channels, are different for adjacent channels.

The lamps 361–366 are connected in parallel across the outputs 373 and 374 of the regulated direct current power supply 351. Variable resistors 375–380 are connected in series with the lamps 361–366, respectively, for providing individual adjustment of the intensity of each lamp thereby enabling the intensities of the lamps to be equalized.

The photodiodes 367–372, which actually constitute portions of voltage dividers of the respective amplifiers 309–313, function as variable resistors. Specifically, when the light incident on a photodiode decreases in response to the presence of a mark in the channel associated with that particular diode, the resistance of the photodiode rises to a relatively high level, while in the absence of a mark in the channel associated with a particular photodiode, the resistance of the photodiode decreases to a relatively low value.

In operation, as the tape is fed past the photosensing station 300 the pairs of visible marks comprising the different coded digits sequentially pass through the photosensing station 300 decreasing the light reflected to the photodiodes in the channels in which the pairs of marks of the various digits appear. The decrease in light incident on the photodiodes in turn decreases their resistance, effectively providing inputs to the photocell amplifiers 309–313. Outputs from the photodiodes 367–372 appear as increased resistance values across the pairs of lines 381a and 381b–386a and 386b, respectively.

The amplifiers 309–314 which are individually responsive to the outputs 381a and 381b–386a and 386b and which collectively comprise the amplifying section 308 are substantially identical in structure. Consequently, a description of the structure and operation of amplifier 314 only will be undertaken. The amplifier 314 includes transistors Q-1 and Q-2 connected in a conventional Darlington circuit configuration. Specifically, transistor Q-1 includes a collector 390 connected in common with the collector 391 of transistor Q-2 to a positive line 392 via a load resistor 393. Transistor Q-1 further includes an emitter 394 connected to the base 395 of transistor Q-2 and to the negative line 374 of power supply 351 via a resistor 396. Transistor Q-1 further includes a base 397 which is capacitively coupled by a capacitor C-1 to the midpoint of a voltage divider formed by a resistor 398 and the photodiode 372 of the photosensing channel 306, the divider being connected between the positive line 392 and the negative line 374. The transistor Q-2 in addition to the base 395 and the collector 391 includes an emitter 399 connected directly to the negative line 374. The output of the Darlington circuit configuration including transistors Q-1 and Q-2 is taken at the collector electrode 391 while the input is fed to the base 397 of transistor Q-1 via coupling capacitor C-1.

Biasing for the transistors Q-1 and Q-2 is provided by a compound voltage divider including serially connected resistors 400 and 401 connected between the positive line 392 and the base 397 of transistor Q-1, and a capacitor C-2 connected between the negative line 374 and the junction of serially connected resistors 400 and 401. In practice, the values of the components forming the compound voltage divider are adjusted to provide operation of transistors Q-1 and Q-2 in saturation when the resistance of the photodiode 372 is at a low value due to the incidence thereon of a high level of light intensity produced in the absence of a mark in the channel 306 of the photosensing station 300. The value of the resistance of resistor 398 in practice is selected so that transistors Q-1 and Q-2 will be driven from saturation to cut-off in response to the drop in voltage of the divider midpoint 403 which occurs when the light intensity incident on the photodiode 372 decreases in response to the presence of a mark in channel 306 of photosensing station 300.

The amplifier 314 further includes a transistor Q-3 having an emitter 405 connected to the negative line 374, and a collector 406 connected via a resistor 411 to a positive line 407 constituting the positive output of the regulated direct current voltage supply 350. Transistor Q-3 further includes a base 404 which is responsive to the output of the Darlington circuit configuration taken at the collection 391 of transistor Q-2. The output of the Darlington circuit configuration, that is, the potential of the collector 391 of transistor Q-2, is coupled to the base 404 of the transistor Q-3 via an RC network including resistor 408 connected between the base 404 and the negative line 374 and a capacitor C-3 connected between the base 404 of transistor Q-3 and the collector 391 of transistor Q-2. This RC network functions to prevent the application to the base 404 of pulses exceeding a predetermined duration. More specifically, the RC network including capacitor C-3 and resistor 408 transmit to the base 404 of transistor Q-3 the entire pulse if it be less than a predetermined duration, and only that portion of a pulse less than the predetermined duration should the pulse in its entirety exceed the predetermined duration.

The amplifier 314 further includes two decoupling networks. The first decoupling network is constituted by the capacitor C-2 and functions to isolate the base circuit of transistor Q-1 from fluctuations in the power supply 350. In addition, this capacitor smooths the bias applied to the base circuit of transistor Q-1.

The second decoupling network includes a resistor 410 in the line 392, and a capacitor C-4 connected between the line 392 and the negative line 374. This second decoupling network also functions to decouple the circuit from the power supply thereby avoiding any positive feedback between transistor stages.

The capacitor C-2, in addition to constituting a part of voltage divider for biasing transistor Q-1 and functioning to isolate the base circuit of transistor Q-1 from power supply fluctuations, also has an additional function. Namely capacitor C-2 removes the resistor 400 from the input impedance of the transistor Q-1. This allows the input impedances of the transistors of the amplifiers 309–314 constituting the counterparts of transistor Q-1 to be equalized, providing the resistors corresponding to resistor 401 are equal, notwithstanding that the resistance of the resistors of the amplifiers 309–314 corresponding to the counterparts of the resistor 400 are differently valued due to different biasing requirements of the various transistors.

In operation, assuming no mark is present in channel 306 of the photosensing station 300, the resistance of the photodiode 372 is at its lower level due to the reflection of a greater amount of light from the lamp 366 to the photodiode. With the photodiode 372 at a lower level of resistance, the midpoint 403 of the voltage divider including the diode 372 and the resistor 398 is at a relatively high value effectively preventing the shunting of current from the base circuit of transistor Q-1. Consequently, a greater portion of the current flowing through the resistive path 400 and 401 is input to the base 397 of transistor Q-1, maintaining transistor Q-1 in saturation. The saturation of transistor Q-1 in turn maintains the transistor Q-2 in saturation as a result of the relatively high potential present on the emitter 394 of transistor Q-1 which constitutes the input to the base 395 of transistor Q-2. The saturation condition of transistor Q-2 lowers the potential of collector 391, providing a reduced input to the base 404 of transistor Q-3 maintaining transistor Q-3 is cut-off. With transistor Q-3 in cut-off the collector 406 constituting the output of the amplifier 314 is at a relatively high level.

Should, however, a mark now pass through channel 306 of the photosensing station 300 reducing the amount of light reflected from the tape to the photodiode 372 the resistance of the photodiode 372 increases effectively lowering the midpoint 403 of the divider. This momentary decrease in the potential at point 403 in response to the momentary decrease in light reflected to the diode 372 as a consequence of a mark passing through channel 306 of the photosensing station 300 effectively provides a momentary shunt in the base circuit of transistor Q-1. The shunt on the base circuit of transistor Q-1 shunts some of the current flowing through resistive path 400 and 401 from the base 397 of transistor Q-1 allowing transistor Q-1 to be driven into cut-off. As transistor Q-1 switches to cut-off, the emitter 394 potential decreases, driving the transistor Q-2 into cut-off via the base 395. As transistor Q-2 is driven into cut-off, the potential on collector 391 increases, biasing the transistor Q-3 into conduction via the base 404. The increased conduction of transistor Q-3 drives the potential of the collector 406 toward the potential of line 374 producing a low level output on line 424 constituting the output of the amplifier 314.

Summarizing, in the absence of a mark in channel 306 of the photosensing station 300, a high level light intensity is transmitted to the photodiode 372 producing low resistance in the photodiode which is reflected as a high level input to the amplifier 314. This high level input produces a high level output on line 424 constituting the output of the amplifier 314. When a mark is present at channel 306 of the photosening station 300, a low level of light is reflected to the photodiode 372, increasing its resistance and thereby lowering the input voltage to the amplifier 314. This low input voltage produces a low level output on line 424 constituting the output of photocell amplifier 314.

The response of the photocell amplifier 314 as well as the photocell amplifiers 309–313, is not affected by ambient temperature changes which cause the resistance of the photodiodes 367–372 to drift. This temperature independence is attributable to the independent biasing action of the compound voltage divider including resistors 400 and 401 and capacitor C-2, and the capacitive coupling of the divider midpoint 403 to the Darlington circuit input at the base 397 of transistor Q-1. The independent biasing of the compound voltage divider maintains the Darlington circuit in a substantially fixed state of saturation, isolated from temperature changes in the photodiode. The isolation is produced by the capacitor C-1 which does not transmit to the base 397 of transistor Q-1, changes in direct current levels at the divider midpoint 403. In effect, the photocell amplifier is responsive only to alternating current signals.

If the independent biasing provided by the compound voltage divider and the isolation provided by capacitor C-1 were not utilized and the midpoint 403 were directly coupled to the base 397 of the transistor Q-1, changes in temperature would affect the degree of saturation of the Darlington circuit transistors Q-1 and Q-2. Specifically, drift in the saturation level of the Darlington circuit transistors would vary the amount of signal change at midpoint 403 required to switch the Darlington circuit transistors. Thus, when the temperature increases lowering the resistance of the photodiodes 367–372, in turn raising the divider midpoint voltage 403, the transistors Q-1 and Q-2 of the photocell amplifier, in turn, require a greater optical contrast between a mark and the absence of a mark. On the other hand, should the temperature decrease the transistors Q-1 and Q-2 are driven to a lower degree of saturation allowing them to be switched to cut-off more easily. With the transistors of the photocell amplifier more easily switched to cut-off, the amplifier becomes more responsive to differences in optical contrast between the mark and the absence of a mark, making it possible for the amplifier transistors to switch in response to the presence of stray marks or paper discolorations.

The digital decoding matrix 318 includes twelve pairs of diodes D1a and D1b, and D2a and D2b, D3a and D3b, D4a and D4b, D5a and D5b, D6a and D6b, D7a and D7b, D8a and D8b, D9a and D9b, D10a and D10b, D11a and D11b, D12a and D12b. The cathodes of the diode pairs D1a and D1b–D12a and D12b are connected in common to lines 431–442, respectively, constituting the twelve outputs of the decoding matrix 318 corresponding to the twelve identification digits 1, 2, 3, 4, 5, 6, 7, 8, 9, 0, the dash symbol, and the asterisk symbol. The anodes of each diode pair are connected to different ones of the photocell amplifier outputs 418–424 in accordance with the two-out-of-six code corresponding to the particular digit represented by the diode pair. For example, the anodes of the diode pair D1a and D1b are connected, respectively, to output 418 of the amplifier 309, which is responsive to marks in the first channel 301 of the photosensing station 300, and to output 423 of amplifier 313 which is responsive to marks in the fifth channel 305 of the amplifying station 300. Thus, the presence of a mark in both channels 301 and 305 corresponding to the digit 1, producing low level outputs on output lines 418 and 423, respectively, reverse biases both diodes D1a and D1b, preventing current from flowing in the output line 431. The absence of current flowing in the output line 431 constitutes an output signal from the first diode pair indicating the presence of the two-out-of-six code on the tape corresponding to the digit 1. In like manner, an output is achieved on line 432 corresponding to the presence of marks in channels 1 and 4 of the tape indicating the existence of the coded digit 2. Thus, there are twelve possible outputs on the twelve different lines 431–442 corresponding to the presence of twelve different pairs of marks in the six columns of the tape.

The solenoid driver circuit 320 includes twelve solenoid drivers 321–332 responsive, respectively, to the twelve digital code signals on lines 431–442 output from the digital decoding matrix 318. Since the solenoid drivers 321–332 are of identical structure and operation, solenoid driver 332 only will be described. The solenoid driver 332 includes a transistor Q-4 having an emitter 450 connected directly to the negative line 374, a base 451 connected to the midpoint of a voltage divider, the divider including serially connected resistors 452 and 453 connected between the digital decoding matrix output line 442 and the negative line 374, and a collector 455 connected to the positive line 407 via a dropping resistor 456. The solenoid driver 332 further includes a Schmitt trigger schematically indicated by the reference numeral 457. A capacitor 458 connected between the collector 455 of transistor Q-4 and the Schmitt trigger input line 459 couples the output of transistor Q-4 to the Schmitt trigger. The input circuit to the Schmitt trigger 457 also includes a resistor 460 connected between the input line 459 and the negative line 374. The Schmitt trigger 457, which can be of any of the well-known designs, functions to provide an output on line 461 of a predetermined level whenever the input on line 459 exceeds a predetermined level.

The solenoid driver 332 further includes a transistor Q-5 having a base 464 which is directly coupled to the output line 461 of the Schmitt trigger, an emitter 462 which is directly coupled to the negative line 374, and a collector 463 coupled via a diode 465 to the line 478 constituting the output of the solenoid driver 332. A Zener diode 466 having its cathode connected to the junction of the cathode of diode 465 and the collector 463 of transistor Q-5 and its anode connected to the negative line 374 is provided to prevent the application of damaging transient voltages to the transistor Q-5, which are produced by the inductive kick of the punch actuating solenoids (not shown) utilized in the card punching apparatus 335.

In operation, when an output is presented on line 442 corresponding to the detection by the photosensing station 300 of a coded asterisk symbol, that is, in response to the detection by the photosensing station of marks in channels 5 and 6, no current flows in line 442. With no current flowing in line 442 transistor Q-4 is driven to cut-off, raising the potential of its collector 455 which is coupled via the capacitor 458 to the Schmitt trigger 457. In response to the input to the Schmitt trigger 457, a positive output is produced on line 461 coextensive in duration to the period that the signal input on line 459 is above the predetermined triggering level of the Schmitt trigger. The output on line 461 from the Schmitt trigger drives transistor Q-5 into saturation, in turn coupling the output line 478 on the solenoid driver to the negative line 374, completing an energization circuit to the card punching solenoid in the card punching apparatus 335 corresponding to the asterisk symbol.

In the absence of an asterisk on the tape at the photosensing station 300, that is, in the absence of marks in channels 5 and 6, one or more of the diodes D12a and D12b is forward biased, allowing current to flow in the output line 442 to the transistor Q-4, driving transistor Q-4 into saturation. With transistor Q-4 in saturation, the collector 455 is at a low potential which, when coupled to the Schmitt trigger 457 by the capacitor 458, produces no Schmitt trigger output. With no output on line 461, transistor Q-5 is cut-off and the diode 465 is reverse biased, preventing energization of the punch-operating solenoid of the card punching apparatus 335. Hence the asterisk symbol is not entered into the punch card.

The card punching apparatus 335 may be of any suitable design capable of appropriately perforating cards in response to the digit signals on output lines 467-478. Preferably, the card punching apparatus 305 is of the design embodied in the punching apparatus manufactured by International Business Machines Corporation under the model number designation 026.

The counter 340 may be of any suitable design which is stepped in response to the receipt of pulses, and provides an output upon the receipt of six pulses. For example, the counter 340 may be of the stepping relay type shown in FIGURE 22. The principal components of the stepping relay counter 340 include a stepping relay generally indicated by the numeral 480. The relay 480 is responsive to the receipt of pulses on line 441 corresponding to the sensing by the photosensing station 300 of a dash symbol represented by marks in channels 1 and 6. The dash symbol is the last of 12 digits in a registration and, hence, can be used to signify the completion of a registration reading cycle. The presence of an input on line 441 constituted by a negative signal drives a normally saturated transistor Q-6 into cutoff, raising its collector potential. The increased collector potential of transistor Q-6 is capacitively coupled to the base circuit of a transistor Q-7, which is normally in cutoff, biasing transistor Q-7 into conduction. The conduction of transistor Q-7 connects the stepping relay 480 to the negative line 374, effectively completing an energization circuit for the relay 480.

Each time the transistor Q-7 is momentarily driven into saturation in response to the presence of an input on line 441, the relay is stepped one position. When the relay 480 has stepped six positions, corresponding to the sixth digit signal on line 441 representing the completion by the photosensing station of the reading of six registrations, the positive line 407 is coupled via the movable contact 481 to the base circuit of a transistor Q-8 driving transistor Q-8 into saturation and effectively connecting the output line 341 of the counter to the negative line 374. The completion of the circuit from output line 341 to the negative line 374, in response to the receipt of the six dash signals, provides a card advance signal on line 341 to the card punching apparatus 335. The card advance signal on line 341 actuates a suitable mechanism in the card punching apparatus 335 for advancing a new card into the card punch and at the same time removing the card presently in the card punch to a storage stack, the card being removed having six registrations punched therein.

A second movable contact 482 ganged to the movable contact 481 is provided for resetting the stepping relay 480 after the receipt of six dash input signals. The movable contact 482, when it steps to the sixth position, completes a circuit from the positive line 484 via a normally closed contact 485 to the base circuit of transistor Q-7 causing transistor Q-7 to be maintained in saturation and the relay 480 energized until the movable contact 482 has stepped back to the zero position.

A reset button 483, which is normally open, is provided for resetting the stepping relay to the zero position. When the normally open reset button 483 is closed, the positive line 484 is connected via the contacts 486, which are closed except when the relay 482 is in the zero position, to the base circuit of transistor Q-7 causing transistor Q-7 to be driven into saturation and the stepping relay 480 stepped to the zero position.

Zener diodes 488 and 489 connected in shunt with the emitter collector paths of transistors Q-7 and Q-8, respectively, prevent the application to the respective transistors of damaging transient voltages produced by the inductive kick of the stepping relay 480 and the solenoid associated with the card advancing mechanism (not shown) of the card punching apparatus 335.

Summarizing, the counter 340 provides an output on line 341 to the card punching apparatus 335 at the completion of the reading of six registrations by the photosensing station 300, enabling the card advancing mechanism of the card punching apparatus 335 to feed a blank punch card to the card punching station, the capacity of such card being six registrations. Counters other than of the construction and operation shown in FIGURE 22 may be utilized. For example, a six position ring counter would be suitable. Likewise, a decade counter comprising four cascaded bistable multivibrators provided with pulse feedback for recycling after a count of six would be suitable.

The lost digit detector 345 includes a NAND circuit 390 having as its input the output 441 corresponding to the dash symbol. The other input to the NAND circuit 390 is a positive pulse from a checking pulser 391. The checking pulser 391 forms part of the card punching apparatus 335 and functions to provide a positive pulse every twelfth card column corresponding to the completion of each registration punching entry into the card. The output taken at line 346 of the NAND circuit 390 is input to a stop tape circuit 347. The stop tape circuit 347 may be any suitable circuit designed to stop the operation of the card reader.

In operation, an output from the NAND circuit 390 to the stop tape circuit 347 for terminating the operation of the card reader will be produced every time a signal appears on line 441 corresponding to a dash digit signal when, at the same time, there is not a positive pulse from the checking pulser 491 corresponding to the presence of the twelfth card column at the punching station of the card punching apparatus 335. In this manner, whenever a dash symbol occurs non-coincident with the presence of the twelfth card column in the card punching station of the card punching apparatus 335, a signal is generated on line 346 for stopping the tape feeding operation. The presence of a dash symbol at a time non-coincident with the presence of a positive pulse from the check pulser 391 indicates that less than the required number of twelve digits per registration have been read by the reader. Consequently, the tape reading operation must be stopped so that a card having an erroneous registration punched therein will not be sent to the card stacker.

Power supplies 350 and 351 may be of any suitable design capable of converting alternating current to regulated direct current. A preferred circuit configuration for power supplies 350 and 351 is shown in FIGURE 21. Power supply 350 includes a stepdown transformer 500, connected to a suitable A.C. source of potential and having an output which is input to a conventional full-wave rectifier 501 connected across the transformer secondary winding. The output of the full-wave rectifier is input to a transistor series regulating circuit including transistor Q–9 having a collector connected to the positive terminal 502 of the rectifier and an emitter 503 connected to the positive line 407 constituting the positive output of the power supply. Transistor Q–9 further includes a base connected to the positive terminal 502 via a biasing resistor 504 and to the collector of a second transistor Q–10. Transistor Q–10 further includes a base connected to the emitter 503 of transistor Q–9, and an emitter connected to the negative line 374 via a Zener diode 505 which constitutes a reference voltage for the regulator. Capacitors 507 and 508 connected across the full-wave rectifier output lines 502 and 374 and across the regulator output lines 407 and 374, respectively, are provided for filtering and smoothing purposes.

In operation, if the impedance across the output of the power supply 350 suddenly decreases, producing a drop in voltage across the power supply 350 output lines 407 and 374, the potential on the base of transistor Q–10 decreases, causing transistor Q–10 to conduct less. The decreased conduction of transistor Q–10, in response to a decreased output voltage, shunts less current from the base circuit of transistor Q–9 causing transistor Q–9 to conduct more heavily. The increased conduction of transistor Q–9 increases the voltage across the impedance connected to the power supply 350, restoring the power supply output voltage on lines 407 and 374 to the regulated level. Should the impedance driven by the power supply 350 suddenly increase, raising the potential on line 407, the transistor Q–10 conducts more heavily shunting more current from the base of transistor Q–9 in turn causing transistor Q–9 to conduct less. The decreased conduction of transistor Q–9 lowers the potential drop across the impedance driven by the power supply 350, in turn lowering the output potential across lines 407 and 374 to the regulated level.

The power supply 351 may be of any suitable type, but preferably is of the type described with respect to power supply 350.

The power supply 352 includes a step-down transformer 510, the output of which is connected across a conventional full-wave bridge rectifier 511 for providing across lines 484 and 374 an unregulated direct current.

In operation, as the registration imprint on the tape of FIGURE 3 is fed through the photosensing station 300, the first digit of the employee identification number, the digit 7, will be read. Specifically, the presence of marks in track one and track two will decrease the amount of light reflected from the lamps 361 and 362 to the photodiodes 367 and 368, respectively, increasing the resistance of the photodiodes and causing the midpoints 403 of the dividers of photocell amplifiers 309 and 310 to decrease in potential. The decreased potential of the divider midpoints of the photocell amplifiers 309 and 310 switches the transistors of these photocell amplifiers, producing negative pulses on output lines 418 and 419 which are input to the digital decoding matrix 318. Specifically, the outputs on lines 418 and 419 are input to the diodes D7a and D7b, respectively, reverse biasing both diodes and terminating any current flow in output line 437 of the digital decoding matrix 318. The termination of current in line 437 corresponding to the output signal from the digital decoding matrix 318 for the digit 7 is input to the solenoid driver 327, causing the transistor therein corresponding to transistor Q–4 to be switched from saturation to cut-off providing an input to its associated Schmitt trigger, which in turn switches the transistor therein corresponding to transistor Q–5, completing a circuit from a negative line 374 to the output line 473 of the solenoid driver 327. The output from the solenoid driver 327 on line 473 is input to the card punching apparatus 335 for producing a perforation corresponding to the digit 7 in the first column of the appropriate registration zone of the card.

In like manner, the continued feeding of the tape depicted in FIGURE 3 through the photosensing station 300 results in the successive reading of the digits 3, 9, 1, 9, and 4 of the employee identification number, the asterisk symbol, the day digit 2, the time digits 0, 9, and 2, and the dash symbol. The successive reading of these digits and symbols results in the successive outputting of the signals on lines 433, 439, 431, 439, 434, 440, 432, 440, 439, 432, and 441 to the solenoid drivers 323, 329, 321, 329, 324, 330, 322 330, 329, 322 and 331, respectively, which, in turn, results in successive signals being input to the card punching apparatus 335 on lines 469, 475, 467, 475, 470, 476, 468, 476, 475, 468 and 477, producing successive perforations in column 2–12 of the card completing the registration punch entry therein.

In addition to perforating the appropriate registration zone of the card in accordance with the imprint appearing on the tape, the sensing by the photosensing station 300 of the dash symbol produces an input to the counter for advancing the counter one position. The dash symbol corresponding to the last digit of the registration is also input to the NAND circuit 390 and, if coincident with the checking pulse from the pulser 391, produces no output on line 346 to the stop tape circuit 347 thereby allowing the tape reading operation to continue. Should, however, the dash symbol be non-coincident with the checking pulse output from the checking pulser 391 indicating that less that the required twelve digits in the registration have been read, an output is produced on line 346 of the NAND circuit 390 and is fed to the stop tape circuit 347, stopping the tape feeding operation. With the tape feeding operation terminated, the operator may manually remove the card then being perforated in the card punching apparatus 335, thereby preventing a card with an erroneous registration from being passed to the card stacker.

Upon the completion of the reading of the six cards by the photosensing station 300, the counter 340 in response to receipt of the six dash symbol signals on line 441 produces an output on line 341 to the card punching apparatus 335 which is effective to advance a blank card to the card punching apparatus 335 and transport the completed card bearing six punched registration entries to the card stacker.

A card format suitable for utilization with the card punching apparatus 335 is depicted in FIGURE 23. The card 620 is a conventional punched card having eighty vertical columns and twelve horizontal rows. Each vertical column may be perforated in accordance with a code for the purpose of representing the twelve possible digits of a registration. Seventy-two columns of the eighty column card are utilized, the seventy-two columns being divided into six sets, or registration zones, of twelve columns each corresponding to the six registrations entered on the card. The first six columns of each registration zone correspond to the six coded digits of the employee identification number, the seventh column bears the coded asterisk symbol, the eighth column bears the coded digit corresponding to the day of the week. The ninth, tenth and eleventh columns bear a three digit coded representation of the time. The twelfth column bears the coded representation corresponding to the dash symbol, indicating the last column of a registration.

As those skilled in the art will appreciate the record tape reader of this invention can also be utilized to provide inputs to the other types of storage devices, such as, magnetic or punch tape recording devices if conversion of the employee time data to magnetic tape or punch tape storage is desired. The conversion of the employee data to punch cards as described in conjunction with the preferred embodiment of the invention is for purposes of illustration, and is not intended to limit the scope of the invention.

Instead of the optically contrasting marks and a reader employing a detector which is photosensitive in nature, it is contemplated that electrically conductive marks and conventional conductive mark sensing techniques can be utilized. In accordance with this contemplated alternative, the conductive marks can be placed on the tape by using a suitable conductive type of carbon, and the sensing of the marks can be facilitated by using a well-known wire brush detector which wipes the tape as the tape is advanced through the reading station. The output of the wire brush detector can then be processed by the reader in substantially the same manner as the output of the photosensing station in the preferred embodiment described, except that instead of utilizing amplifiers responsive to inputs from photoconductive type detectors, amplifiers would be used which are responsive to resistive type inputs.

We claim:
1. A system for providing on a single record medium a permanent machine readable and humanly intelligible timed entry of the arrival and departure activities of a plurality of employees which is made directly from employee-identifying embossments formed on a card and which, at the time the entry is made, is both visible and intelligible to the employee for verification purposes, said system comprising:
   a plurality of identification cards each having embossed employee-identifying machine readable information thereon comprising characters having different combinations of less than all of a predetermined number of possible embossed index positions; and
   a recording unit including:
      (a) a housing having an entry viewing means and a card inserting slot;
      (b) a time head within said housing for providing a periodically varying embossment of the current time in humanly intelligible form and in machine readable form comprising characters having different combinations of less than all of a predetermined number of possible embossed index positions;
      (c) a record holder positioned within said housing in juxtaposition to said time head for receiving cards inserted through said slot into said recording unit;
      (d) a selectively operable platen movable relative to said employee-identifying and time embossments for urging said record medium and said embossments into imprinting relationship, thereby producing an entry on said record medium of said employee-identifying information and the time of card insertion, said entry comprising a plurality of photosensible marks arranged in channels corresponding in number to said predetermined number and in rows corresponding in number to the number of characters contained in said embossments, said channels and rows being substantially orthogonal for enabling said entries to be read serial-by-character and parallel-by-mark by a multi-track reader having one photosensing device for each of said channels;
      (e) record medium feed means within said housing for feeding said record medium from a recording station adjacent said time embossment and said employee-identifying embossment of a card positioned in said card holder to a viewing station permitting an employee inserting his card into said recording unit to view the entry made as a consequence thereof, and thereby verify the time of card insertion.

2. A recording unit responsive to the insertion therein of a card for producing an imprint on a record medium of an embossment formed on said card and of the time of the card insertion, said recording unit comprising:
   a time head for providing a periodically varying embossment of the current time;
   a card holder positioned in juxtaposition to said time head for receiving cards inserted into said recording unit;
   record medium feed means for feeding said record medium adjacent said time embossment of said time head and the employee identifying embossment of a card positioned in said card holder; and
   a selectively operable platen movable parallel to said juxtaposed employee-identifying and time embossments for urging said record medium and said embossments into imprinting relationship to thereby produce said entry of said employee-identifying information and said time of card insertion on said record medium; said platen comprising:
      (a) at least one driven sprocket and at least one idler sprocket, the axes of said sprockets being spaced from and parallel to each other and to the plane of said card and time embossments;
      (b) a chain trained over said idler sprocket and said driven sprocket;
      (c) a platen roll mounted to said chain for urging said record medium and said embossments into imprinting relation as said driven sprocket imparts motion to said chain; and
      (d) motor means drivingly connected to said driven sprocket for imparting motion to said chain and ultimately to said platen roll for producing an imprint on said record medium of said card and time embossments.

3. A system for providing on a single recording medium a permanent record of the arrival and departure activities of a plurality of employees, said system comprising:
   a plurality of employee-identification records each having embossed employee-identification information thereon in machine readable and humanly intelligible form, said machine readable information including characters comprising different combinations of less than all of a predetermined number of possible embossed index positions;
   a recording unit including:
      (a) a time head for providing a periodically varying embossment of the current time in machine readable and humanly intelligible form, said machine readable time embossment comprising characters having different combinations of less than all of a predetermined number of possible embossment index positions;
      (b) a record holder positioned in juxtaposition to said time head for receiving cards inserted into said recording unit;
      (c) record medium feed means for feeding said record medium adjacent said time embossment and said employee-identifying embossment of a card positioned in said card holder;
      (d) a selectively operable platen movable parallel to said employee-identifying and time embossments for urging said record medium and said embossments into imprinting relationship, thereby producing an entry on said record medium of said employee-identifying information and said time of card insertion, said entry comprising a plurality of photosensible marks arranged in channels corresponding in number to said predetermined number and in rows corresponding in number to the number of characters contained in said embossments, said channels and rows being substantially orthogonal; and a multi-track photosensing station having one sensing reader for each of said channels for reading each of said entries serial-by-character and parallel-by-mark, and providing outputs for operating suitable apparatus for reading said characters on a second record medium, said readers each comprising:

(a) a voltage divider including a photodiode responsive to the light reflected from said mark and a resistor, said photodiode and resistor being connected in series and separated by a tap point whose potential fluctuates at least a predetermined amount in response to resistance fluctuations of said photodiode caused by changes in intensity of said reflected light induced by the arrival of said mark;

(b) a high impedance transistor switching circuit having an input terminal and an output terminal, the potential of said output terminal changing when said transistor switches;

(c) a capacitor coupling said tap point and said input terminal for transmitting only A.C. signals between said tap point and said input terminal; and (d) biasing means for maintaining constant the magnitude of A.C. signal required to switch said transistor switch means in response to said presence of said mark at said sensing station, thereby rendering said reader insensitive to ambient temperature changes which alter the average D.C. level of said tap point potential.

4. The system of claim 3 wherein the last character to be read in each of said entries is a control character; and wherein said reader includes a coincidence detector for generating a reader stop signal when a control character is read noncoincidently with the presence of a check pulse generated at a point in time corresponding to the end of an entry containing the proper number of characters.

5. A reader for optically sensing the presence at a sensing station of a mark on an optically contrasting tape, said reader comprising:

a voltage divider including a photodiode responsive to the light reflected from said mark and a resistor, said photodiode and resistor being connected in series and separated by a tap point whose potential fluctuates at least a predetermined amount in response to resistance fluctuations of said photodiode caused by changes in intensity of said reflected light induced by the presence of said mark;

a high impedance transistor switching circuit having an input terminal and an output terminal, the potential of said output terminal changing when said transistor switches;

a capacitor coupling said tap point and said input terminal for transmitting only A.C. signals between said tap point and said input terminal; and biasing means for maintaining constant the magnitude of A.C. signal required to switch said transistor switch means in response to said presence of said mark at said sensing station, thereby rendering said reader insensitive to ambient temperature changes which alter the average D.C. level of said tap point potential.

6. The reader of claim 5 wherein said high impedance transistor switching means includes a Darlington circuit, and wherein said biasing means includes a compound voltage divider comprising a second resistor and a second capacitor connected in series across a source of potential, and a third resistor connected between said input of said Darlington circuit transistor switching means and a point common to said second resistor and said second capacitor, whereby said second capacitor renders the Darlington circuit input impedance independent of said second resistor, thereby permitting said second resistor to be varied to adjust the bias level of said Darlington circuit without altering said input impedance.

References Cited

UNITED STATES PATENTS

| | | | |
|---|---|---|---|
| 633,126 | 9/1899 | Deubner | 346—58 |
| 678,433 | 7/1901 | Heene | 346—58 X |
| 2,988,269 | 6/1961 | Reichert | 346—50 X |
| 3,020,116 | 2/1962 | Pudelko | 346—141 X |
| 3,184,714 | 5/1965 | Brown et al. | 235—61.11 X |

RICHARD B. WILKINSON, *Primary Examiner.*

J. W. HARTARY, *Assistant Examiner.*